United States Patent
Nambudiri et al.

(10) Patent No.: US 6,640,214 B1
(45) Date of Patent: Oct. 28, 2003

(54) PORTABLE ELECTRONIC TERMINAL AND DATA PROCESSING SYSTEM

(75) Inventors: Narayan S. Nambudiri, Kings Park, NY (US); Thomas K. Roslak, Eastport, NY (US); Jerome Swartz, Old Field, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/232,142

(22) Filed: Jan. 16, 1999

(51) Int. Cl.$^7$ .............................................. G06F 17/60
(52) U.S. Cl. ............................ 705/26; 705/27; 705/28; 705/29
(58) Field of Search ................ 705/26–29; G06F 17/60

(56) References Cited

U.S. PATENT DOCUMENTS

| | | | |
|---|---|---|---|
| 4,758,717 A | 7/1988 | Shepard et al. | 235/472 |
| 5,047,614 A | 9/1991 | Bianco | 235/385 |
| 5,468,942 A | 11/1995 | Oosterveen et al. | 235/383 |
| 5,640,193 A | 6/1997 | Wellner | 348/7 |
| 5,664,110 A * | 9/1997 | Green et al. | 705/26 |
| 5,832,446 A * | 11/1998 | Neuhause | 705/1 |
| 5,857,156 A | 1/1999 | Anderson | 455/517 |
| 5,859,414 A * | 1/1999 | Grimes et al. | 235/383 |
| 5,978,773 A | 11/1999 | Hudetz et al. | 705/23 |
| 6,058,304 A | 5/2000 | Callaghan et al. | 455/422 |
| 6,246,993 B1 * | 6/2001 | Dreyer et al. | 705/9 |
| 6,314,406 B1 * | 11/2001 | O'Hagan et al. | 705/14 |

FOREIGN PATENT DOCUMENTS

| | | | | |
|---|---|---|---|---|
| DE | 3511832 A | * | 10/1986 | G06F/3/00 |

OTHER PUBLICATIONS

Miller et al., PGPUB–Document–No.: 20020030105—Mar. 14, 2002, System, method & article of manufacture for commerce utilizing a bar code–receiving terminal.*

Carpenter Jr. et al., PGPUB–Document–No.: 20020022994—Feb. 21, 2002, System, method, & article of manufacture for generating a personal web page based on use–input bar code info.*

Maurren Murray, Supermarkets getting wired for the future Industry gets set for explosion of technology, Toronto Star, Final ed. p. E1 May. 4, 1994 (from Dialog, file 727, acc.No. 03333403).*

Internet archive from web site: Wayback Machine for http://www.mealsforyou.com, shows this site history & contents.*

Murray, Supermarkets getting wired for the future Industry gets set for explosion of technology, Toronto Star, Final ed. p. E1 May 4, 1994.*

* cited by examiner

*Primary Examiner*—Cuong Nguyen

(57) ABSTRACT

The present invention relates to a personal shopping system for combined use in both the home of a user and a shopping establishment. The system includes a host computer which is coupled to a host modem and, optionally, to at least one wireless multi-access point. At least one shopping establishment kiosk cradle is employed to interface with a portable terminal which is also part of the system. The portable terminal can be used in both the shopping establishment and the home of the user. It is configured to read bar codes associated with items related to shopping, and includes a memory, a bar code reader, a wireless transceiver, and a data interface. The data interface of the terminal communicates with a data interface of the shopping establishment kiosk cradle. A home cradle for the portable terminal is also provided and is adapted to remain in the home of the user. It includes a home portable terminal-receiving station and a home data interface to communicate with the data interface of the portable terminal. A home data transfer circuit is also included to permit data exchange between the home data interface and the modem coupled to the host computer. The portable terminal can be provided with unique identifying indicia so that the terminal can serve as a form of identification for a user of the system. Database management of shopping lists for multiple establishments, including customer preferences, can be performed.

67 Claims, 32 Drawing Sheets

PORTABLE ELECTRONIC TERMINAL AND DATA PROCESSING SYSTEM

RELATED APPLICATIONS

This application is a continuation-in-part of U.S. patent application Ser. No. 09/087,086, filed on May 29, 1998.

FIELD OF USE

This invention relates generally to an improved data processing system which may be used inter alia with a system for ordering and supplying selected goods and services. More specifically, this invention relates to a portable terminal which may be used in conjunction with a personal shopping system which can be used in both a home of a user and a shopping establishment. The portable terminal can be further used, for example, by health care professionals to track medications and patient status, and by postal carriers to track mail deliveries.

BACKGROUND OF THE INVENTION

Hand-held computer terminals are well known in the prior art for many different applications, including their use in consumer portable shopping applications. Examples of prior art hand held terminals include the Palm Pilot™ and Sharp Wizard organizer as well as terminals available from Symbol Technologies, Inc., the assignee of the present invention, which is generally describe in U.S. Pat. No. 4,758,717.

Another example of the use of hand held terminals, in the context of a portable shopping application, is described in U.S. Pat. No. 5,468,942 to Oosterveen et al. The Oosterveen '942 Patent describes a system in which an authorized customer is issued a terminal having an integrated bar code scanner to record merchandise purchases. After items are scanned with the bar code scanner, the terminal maintains a record of merchandise selected for purchase by the customer within an internal memory. Prior to exiting the store, the information stored in the memory of the scanner is down loaded through a communication port attached to a terminal dispenser, and a printed ticket of the customer's purchases is printed on a printer. The customer then proceeds to a check out register where the customer tenders payment for the purchased merchandise. Occasional customers may be audited in order to ensure integrity of the self-service system.

U.S. Pat. No. 5,047,614 to Bianco discloses a method and apparatus for computer-added shopping. A consumer is provided with a hand-held bar code reader and can scan various items at home. The user can order from home over a modem, or can dock the bar code reader in a kiosk at a store, and can then receive a printed shopping list with directions. Yet further, a list of items can be transmitted from the store kiosk to a warehouse for remote picking.

U.S. Pat. No. 5,664,110 to Green et al. discloses a remote ordering system. A user is provided with a display/processor unit which has an interactive video display for building a shopping list. Information on various products is stored in local memory in the display/processor unit. Communication between the display/processor unit and a central data format/transfer computer takes place when an order is to be placed, or if the locally-available product information needs to be updated or is missing. Communication can be by telephone, fiber optics and the like.

Co-assigned U.S. patent application Ser. No. 08/866,690 filed May 30, 1997 discloses a portable shopping and order fulfillment system with enhanced ordering and product data profiles, order collection and order fulfillment. The disclosure of U.S. patent application Ser. No. 08/866,690 is hereby expressly incorporated herein by reference, as are the disclosures of its parent U.S. patent application Ser. No. 08/780,023 filed Dec. 20, 1996 and its grandparent U.S. patent application Ser. No. 08/706,579 filed Sep. 5, 1996.

The prior art self-checkout systems can enhance the consumer's shopping experience. However, they exhibit certain deficiencies. For example, they may not provide adequate security, or may require cumbersome separate cards for security purposes. Further, prior art systems may not be able to deal effectively with multiple shopping establishments or varying user needs. There currently exists a need for a personal shopping system portable terminal with a convenient security system, and which is capable of enhanced shopping database management.

In addition, there exists a need for a consumer friendly system which is easy to use, provided multiple functions to a user and which can be used for multiple application, including non-shopping related functions without modification. There also exists a need for an improved cradle system for receiving multiple data terminals. The need exists for a field configurable cradle setup with multiple communication protocols, modularity and simplicity of design.

SUMMARY OF THE INVENTION

It is the object of the present invention to provide an improved portable terminal which may be used in a personal shopping system.

It is a further object of the present invention to provide such an improved portable terminal with an enhanced security system.

It is yet a further object of the present invention to provide an improved portable terminal which can be used by a given consumer in both a home and store location, and can perform enhanced shopping database management.

It is a further object of the present invention to provide an improved cradle system which provides modular scalability and multiple communication alternatives.

It is a further object of the present invention to provide a cradle architecture which communicates with industry standard network architecture and which is held configurable in terms of hardware configurations and communication network setup.

The present invention provides a personal shopping system for combined use in both the home of the user and at least one shopping establishment. The system includes a host computer coupled to a host modem, and at least one shopping establishment kiosk cradle. The system further includes a portable terminal according to the present invention which comprises a two-way data interface configured to read bar codes associated with items related to shopping, and a memory coupled to the two-way data interface for storing data associated with the bar codes. The two-way data interface is configured for data exchange with other data interfaces to be discussed below.

The shopping establishment kiosk cradle includes a kiosk portable terminal-receiving station and a kiosk data interface associated with the kiosk portable terminal-receiving station. The shopping establishment kiosk cradle accepts the data associated with the bar codes from the portable terminal through the kiosk data interface and the terminal two-way data interface when the portable terminal is received in the kiosk portable terminal-receiving station, and then downloads the data associated with the bar codes to the host computer.

A home cradle associated with the home of the user is also provided. The home cradle includes a home portable terminal-receiving station and a home data interface which is associated with the home portable terminal-receiving station. The home cradle also includes a home data transfer circuit which is coupled to the home data interface for data exchange therewith. The home data transfer circuit is configured for data exchange with the host modem. The terminal two-way data interface of the portable terminal is configured for data exchange with the home data interface when the portable terminal is received in the home portable terminal-receiving station. The home data transfer circuit supplies the host computer with the data associated with the bar codes when the portable terminal is received in the home portable terminal-receiving station. The host computer receives the data associated with the bar codes, whether from the kiosk cradle or the home cradle, and stores the data in a shopping list data base.

The portable terminal can contain intrinsic identifying indicia to identify the user to the host computer. The memory of the portable terminal can be configured to store multiple lists of data associated with the bar codes, as multiple shopping lists corresponding to multiple shopping establishments.

The present invention comprises the portable terminal, the portable terminal in combination with the home cradle, and the portable terminal and home cradle in combination with the remaining components of the system, including the host computer, the host modem, and at least one shopping establishment kiosk cradle.

The present invention also provides a method of placing an order for items including at least one of goods and services. The method includes the steps of reading bar codes associated with the items via a two-way terminal data interface of a portable terminal; storing data associated with the bar codes in a memory of the portable terminal; and then transferring the data associated with the bar codes to a host computer for storage in a shopping list database. The transferring step includes the sub-steps of transferring the data associated with the bar codes from the memory of the portable terminal to the two-way terminal data interface of the portable terminal; transferring the data associated with the bar codes from the two-way terminal data interface to a data interface of either a kiosk portable terminal-receiving station of a shopping establishment kiosk cradle or a home portable terminal-receiving station of a home cradle; and then transferring the data to the host computer. The method further includes transmitting identifying indicia to the host computer to identify the user to the host computer; the indicia can be the aforementioned intrinsic identifying indicia contained in the portable terminal. A telephone "caller ID" function can be employed for additional security.

The present invention also provides for an improved terminal design and cradle assembly which may be utilized in numerous applications such as, for example, inventory control, package tracking and health maintenance tracking. The improved terminal provides for improved power management, self-diagnosis, cradle communications and system architecture as well as improved economics and programmability. In combination, the present invention also provides for an improved field configurable cradle assembly which permits the use of multiple terminals at a location and simultaneous data transfers over an industry standard network architecture such as "Ethernets" and RS232 serial communication channels. The cradles are programmable to control multiple terminal data communications and may be attached and/or stacked to each other to provide multiple physical layouts at a user receiving area. The cradles may then be used to "synch" data through a central station and to transfer data to various destinations.

BRIEF DESCRIPTION OF THE DRAWINGS

The present invention will be understood and appreciated more fully from the following detailed description, taken in conjunction with the drawings, in which:

FIG. 31 shows an example of screens corresponding to the bar code scanner test of FIG. 28;

DETAILED DESCRIPTION OF THE PREFERRED EMBODIMENTS

Figure 1:
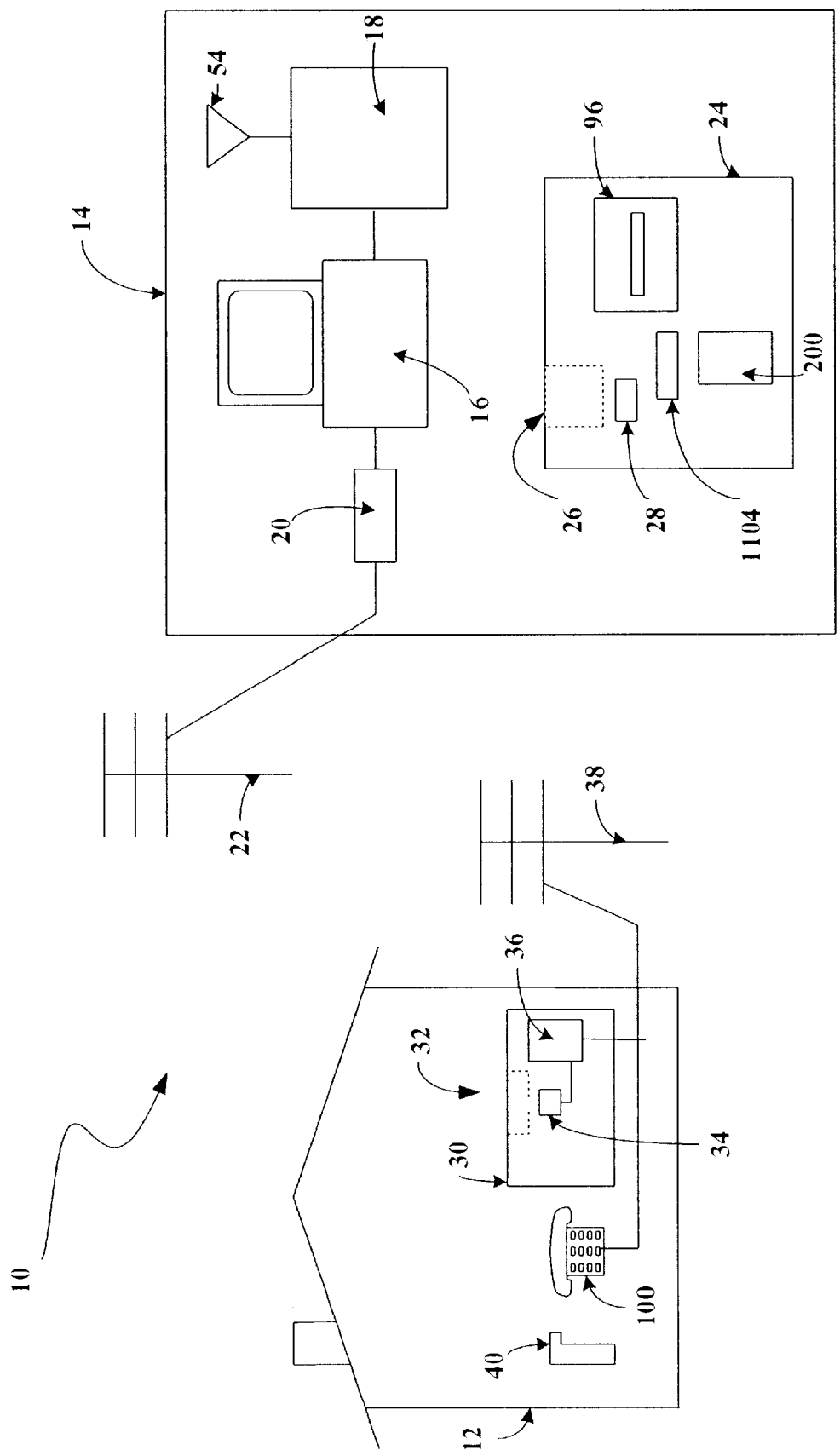
FIG. 1 is a semi-schematic view of a personal shopping system employing the portable terminal of the present invention.

With reference to FIG. 1, a personal shopping system 10 is suitable for combined used in both a home 12 of a user and at least one shopping establishment 14. The system includes a host computer 16. Host computer 16 can be located in shopping establishment 14, or can be otherwise associated therewith; e.g., it can be remotely located therefrom but in communication with other components of the system within shopping establishment 14. For example, the host computer 16 could be a grocery or retail store's main computer which is coupled to a set of cash registers; a central site system dedicated for home shopping or shopping generally from locations other than a store's retail facility; or a combination of both. Internet access to host 16 can also be employed.

System 10 also optionally includes at least one wireless multi-access point 18 which is associated with the shopping establishment 14 and which is coupled to the host computer 16. Wireless multi-access point 18, if used, would normally be present in or near shopping establishment 14 in order to pick up signals from a portable terminal to be discussed below, when the portable terminal is present within the shopping establishment 14.

The system further includes a host modem 20 which can be situated similarly to the host computer and which is coupled to the host computer 16. Host modem 20 can in turn be coupled to a public or private telephone line 22 which may be hard-wired, cellular, satellite and the like.

The system further includes at least one shopping establishment kiosk cradle 24 coupled to the host computer 16. The kiosk cradle 24 in turn includes a kiosk portable terminal-receiving station 26 and a kiosk data interface 28 which is associated with the kiosk portable terminal-receiving station 26. By "associated" it is meant that the kiosk optical interface 28 is located so as to communicate with a two-way data interface of the portable terminal, to be discussed below, when the portable terminal is placed in the portable terminal-receiving station 26.

The system yet further includes a home cradle 30 which is associated with the home 12 of the user. In this context, "associated" would normally imply that the home cradle 30 is located within the home or at some nearby location where it is convenient for the user to use the home cradle without having to separately travel to a shopping establishment 14. Home cradle 30 includes a home portable terminal-receiving station 32 and a home data interface 34 which is associated with the home portable terminal-receiving station 32. Again, by "associated" it is meant that the data interface 34 is so located so as to interface with a corresponding two-way data interface of a portable terminal, to be discussed below, when the portable terminal is placed in the portable terminal-receiving station 32 of the home cradle 30.

Home cradle 30 still further includes a home data transfer data circuit 36. Transfer circuit 36 is coupled to the home data interface 34 so as to engage in data exchange with the optical interface, and is also configured for data exchange with the host modem 20. Such data transfer can occur, for example, through telephone line 38 which can be any of the types discussed above for telephone line 22.

Figure 3B:
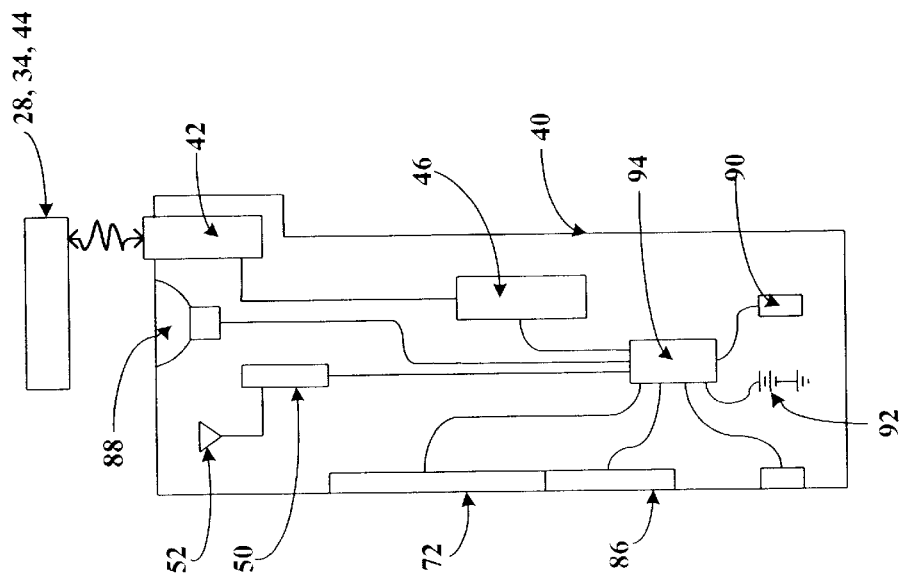
FIG. 3B is a side semi-schematic cross-sectional view of the portable terminal of FIG. 3A.
Figure 3A:
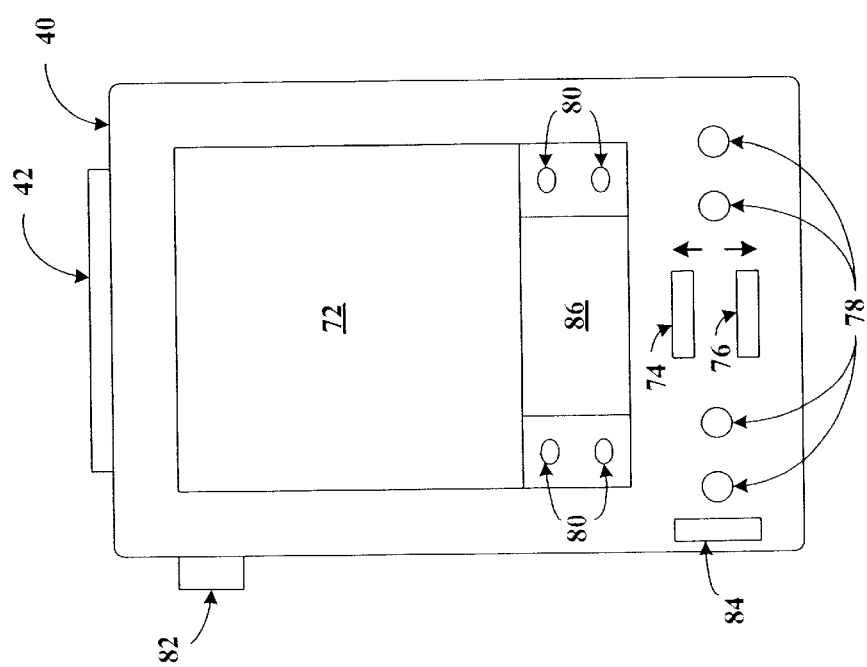
FIG. 3A is a front elevational view of a first embodiment of portable terminal of the present invention.

The system also includes a portable terminal 40. It will, of course, be appreciated that normally there will be many such terminals for the different users of the system. However, only a single terminal 40 is shown in the drawings in order to clearly illustrate the principles of the present invention. Referring now to FIGS. 3A and 3B, a first embodiment of portable terminal 40 includes a two-way data interface 42, such as a laser or CCD bar code reader, which is configured to read bar codes associated with items 44 related to shopping. The items 44 can be, for example, empty packages of items which it is desired to re-stock; items from a catalog representing goods or services; and the like. Portable terminal 40 also includes a memory 46 coupled to the two-way data interface 42 for storing data associated with the bar codes from the items 44. Memory 46 could include RAM and also identification ROM circuitry discussed below. Thus, the memory would be used to store lists of products desired for purchase. Terminal two-way data interface 42 is configured for data exchange with the kiosk data interface 28 when the portable terminal 40 is received in the kiosk portable terminal-receiving station 26. Terminal data interface 48 is also configured for data exchange with the home data interface 34 when the portable terminal 40 is received in the home portable terminal-receiving station 32. Items 28, 34 & 44 are all depicted schematically by a single rectangle in FIG. 3B; it will be appreciated that they are in fact separate items which are merely illustrated in this fashion for convenience.

Portable terminal 40 can further optionally include a wireless transceiver 50 which is coupled to memory 46 and which is configured for wireless communication with the optional at least one wireless multi-access point 18 when a user of the system takes the portable terminal 40 into the shopping establishment 14. Optional transceiver 50 may be provided with a suitable antenna 52 which is compatible with an antenna 54 of wireless multi-access point 18 (as shown in FIG. 1). In a preferred embodiment, the wireless transceiver is either a direct sequencing or frequencing shopping communication scheme working at ranges at or above 900 MHZ. One example of such a wireless network is the Spectrum 24™ system sold by Symbol Technologies, Inc., the assignee of the present invention. Optionally, an initialization procedure can be carried out on terminal 40 when entering a shopping establishment 14, by swiping a special bar code or otherwise, to set an appropriate frequency for wireless communication and to enter an appropriate code for security and identification purposes.

In operation, home data transfer circuit 36 supplies host computer 16 with the data associated with the bar codes of the shopping-related items 44 when the portable terminal 40 is received in the home portable terminal-receiving station 32. Shopping establishment kiosk cradle 24 accepts the data associated with the bar codes of the shopping-related items 44 from the portable terminal 40 through the kiosk data interface 28 and the terminal two-way data interface 42 when the portable terminal 40 is received in the kiosk portable terminal-receiving station 26, and then downloads the data associated with the bar codes of shopping-related items 44 to the host computer 16. Host computer 16 receives the data associated with the bar codes of the shopping-related items 44 and stores the data in a shopping list database.

Figure 4:
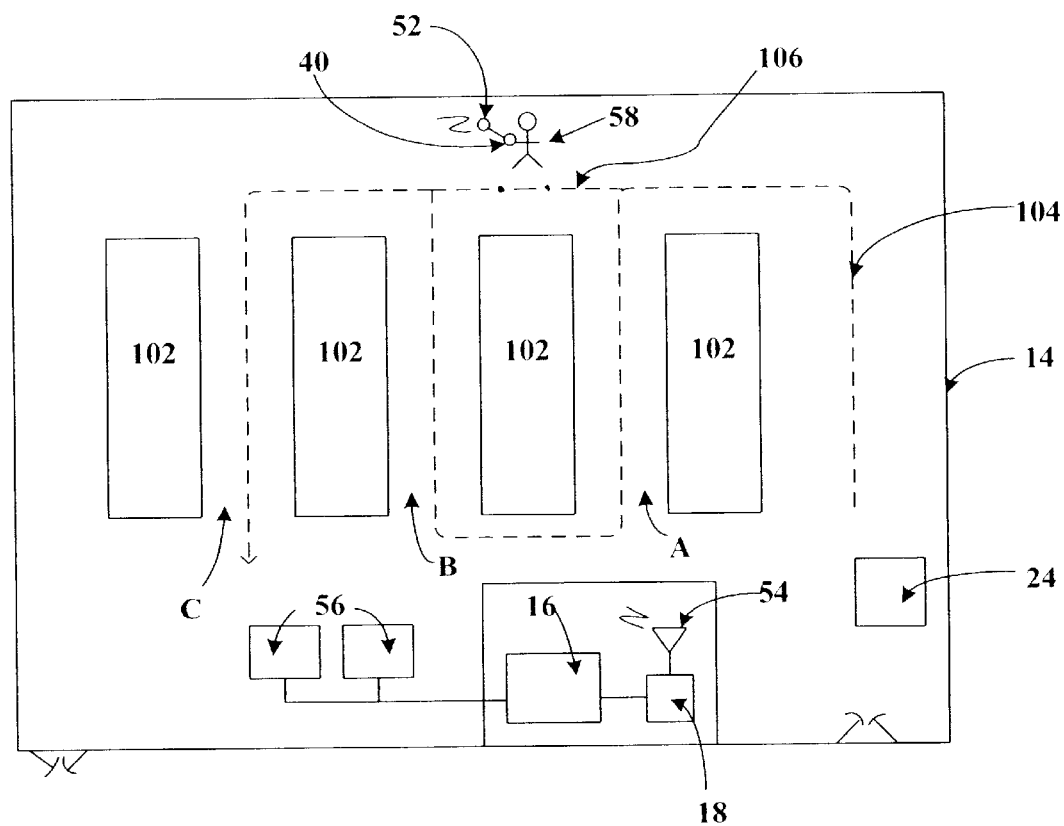
FIG. 4 is a semi-schematic plan view showing use of the portable terminal in a shopping establishment.

With reference to FIG. 4, the system 10 can also include at least one point-of-sale checkout terminal 56 associated with the shopping establishment 14 and coupled to the host computer 16. Point-of-sale checkout terminal 56 can be employed by a user 58 to pay for purchases made with system 10 (optionally, with assistance from a sales clerk). Alternatively, the checkout terminal could be an automatic payment center for receiving payment, bagging material and removing/detaching electronic surveillance tags, such as RFID tags, magnetic tags or ink tags. The area would also be monitored by camera or an attendant serving multiple registers 56.

The portable terminal 40 can further include intrinsic identifying indicia (not amenable to further illustration) to identify the bearer to the host computer 16 as an authorized user 58. Such indicia can include a unique identification code which can be "burned in" to circuitry (e.g., ROM, PROM, EPROM) of the portable terminal 40 or which may be set, for example, by dip switches or stored in a secure manner in RAM or in any other convenient manner. Thus, once the user 58 receives authorized possession of the portable terminal 40, he or she need not have a separate ID card. Terminal 40 can thus function as an "identifying token" or "electronic key." A personal identification number (PIN) can be used instead or as a supplement, for added security (to guard against theft of terminal 40). Yet further, terminal 40 can be used in conjunction with a credit or debit card of the user and can have identical identifying indicia (and an identical PIN); interface with the magnetic strip reader could be provided for entering credit card information into terminal 40 or directly into host 16.

Figure 5B:
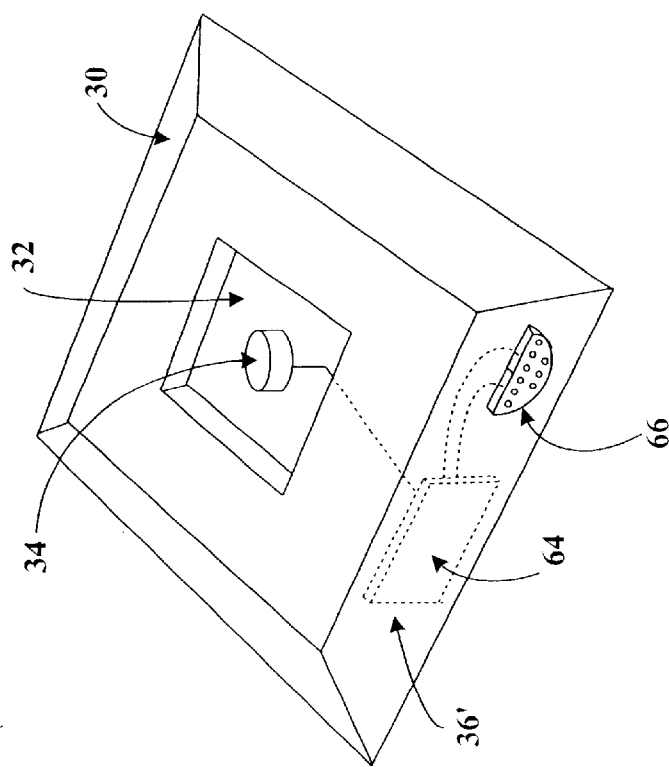
FIG. 5B is a second embodiment of home cradle for use with the first embodiment of portable terminal of the present invention.
Figure 5A:
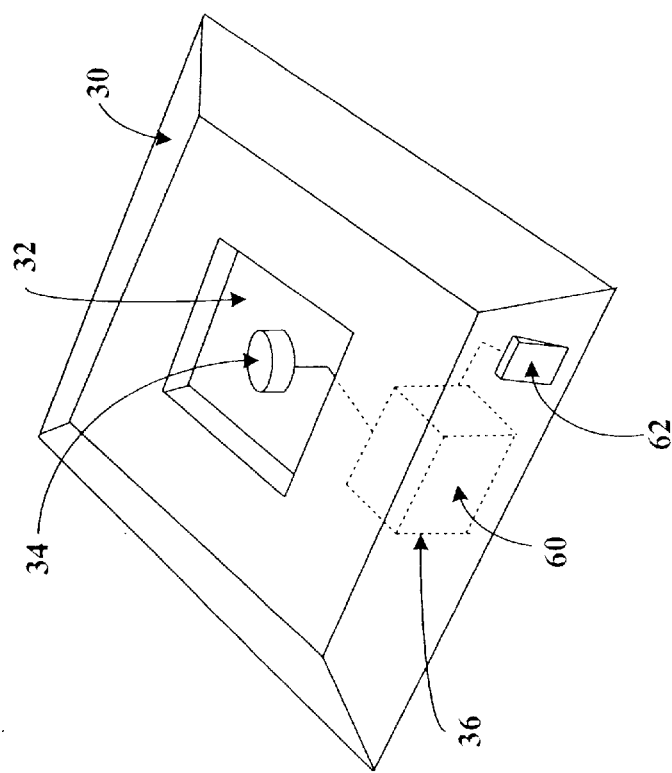
FIG. 5A is a first embodiment of home cradle for use with the first embodiment of portable terminal of the present invention.

With reference now to FIGS. 1 and 5A, home data transfer circuit 36 can simply be a home modem 60 or network adapter which communicates with host modem adapter 20. A suitable telephone jack 62 can also be provided.

Figure 2:
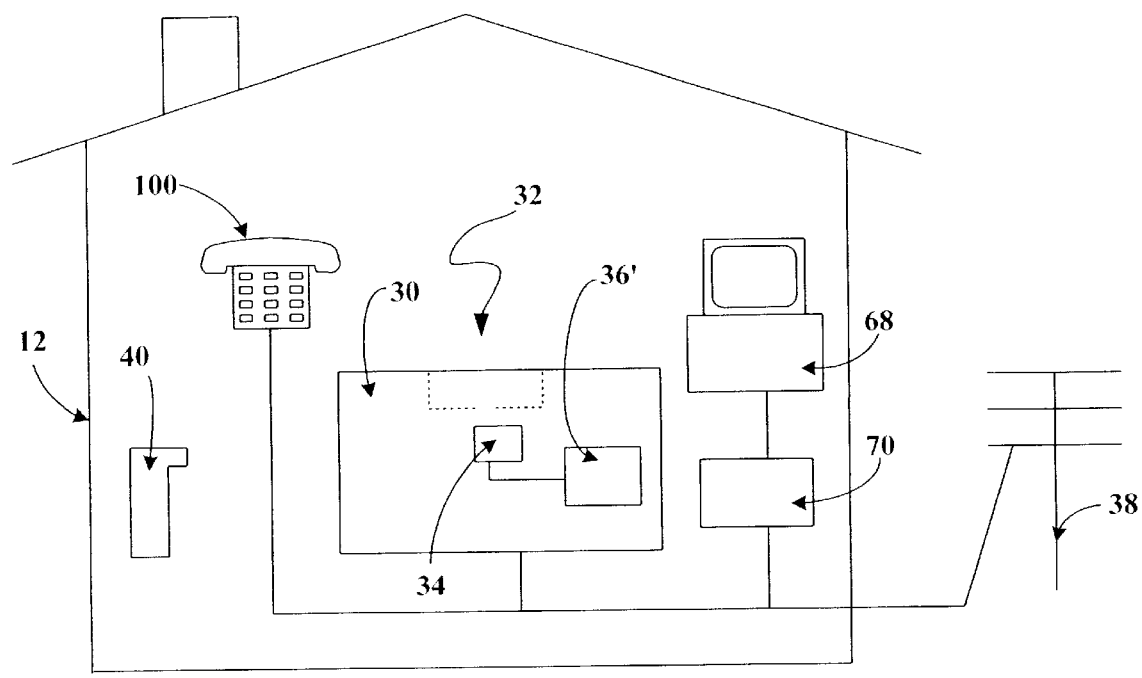
FIG. 2 is an alternative embodiment of a home portion of the system of FIG. 1.

Reference should now be had to FIGS. 2 and 5B which illustrate a system with an alternative data transfer circuit and wherein like parts have received the same number. Alternative data transfer circuit 36' includes an interface card 64 for coupling the home cradle 30 to a separate home personal computer 68 and home modem 70, which in turn communicate with host modem 20. Card 64 can be coupled to home computer 68 through a suitable computer cable connector 66, for example. It should be appreciated that kiosk data interface 28 and home data interface 34 can be any type of suitable interface, for example, optical, electrical plug, radiophone, inductive transfer (such as used in heart rate monitors), and the like, including combinations thereof Optical interfaces are illustrated for convenience. Similarly, any type of suitable interface can be employed for two-way data interface 42 of terminal 40: optical, electrical plugs, radiophone, inductive transfer, and the like. A two-way optical interface is illustrated in FIGS. 3A and 3B for convenience. In such a system, a stationary laser is normally employed and item 44 must be "swiped."

Figure 9B:
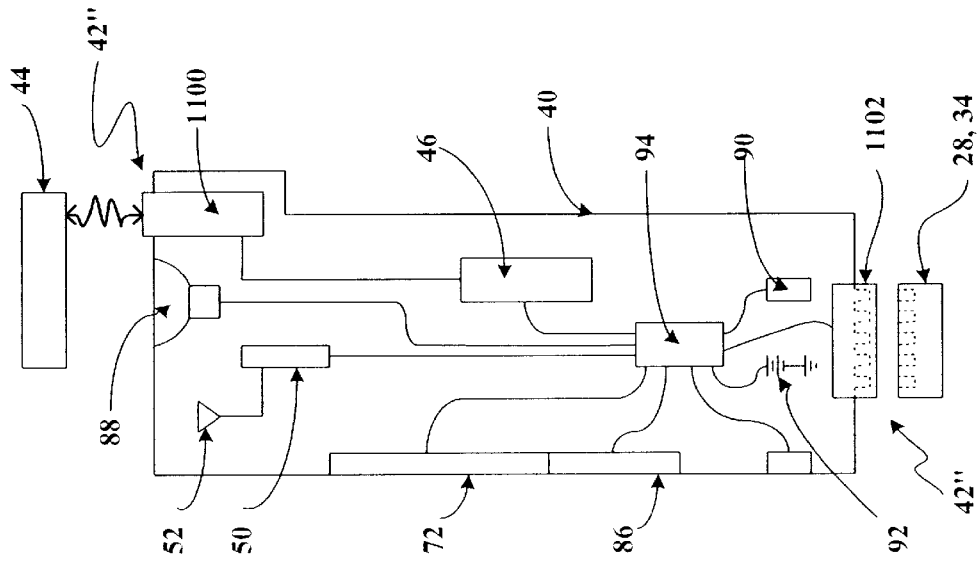
FIG. 9B is similar to FIG. 3B but also depicts the third embodiment of portable terminal of the present invention.
Figure 9A:
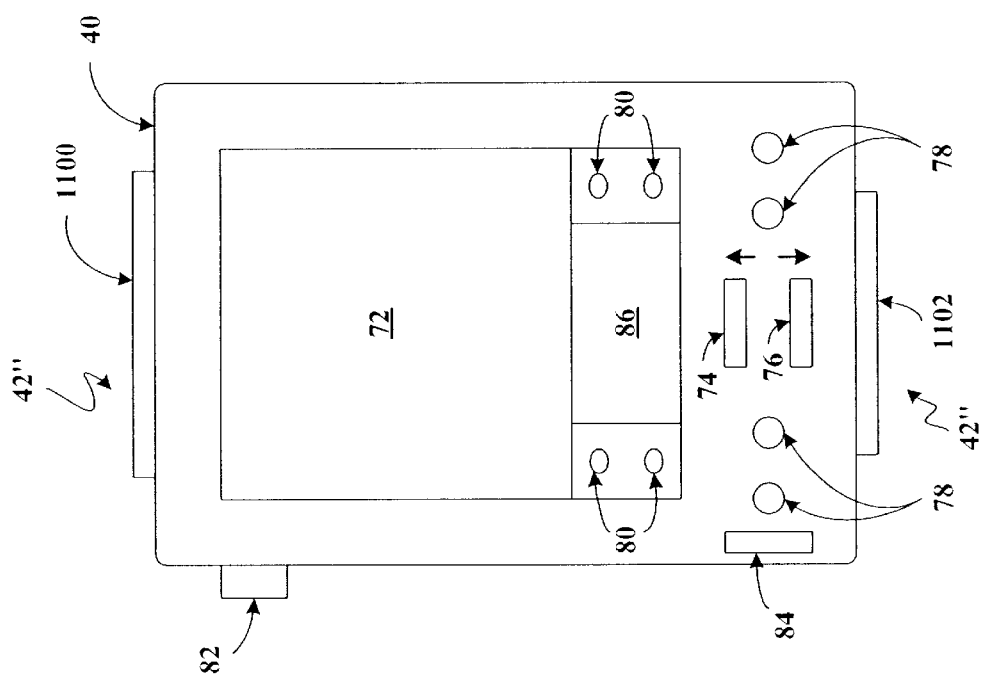
FIG. 9A is similar to FIG. 3A but depicts a third embodiment of the portable terminal of the present invention.

Reference should now be had to FIGS. 9A and 9B, which are similar to FIGS. 3A and 3B except for a different two-way data interface 42" which is formed by a bar code scanner such as conventional moving laser bar code scanner 1100, and a separate electrical plug-type connector 1102 (or other interface discussed above) for communication with the other data interfaces of the system, which in this case would also be electrical plug (or other corresponding) types. Thus, a nominally "one-way" bar code scanner, such as item 1100, and the plug-type connector 1102 (or other interface) together enable two-way communication and form two-way data interface 42".

With reference now again to FIGS. 3A and 3B, portable terminal 40 can optionally include a display 72 for displaying information to the user and a plurality of control keys for permitting the user to interact with the display 72. The control keys can include, for example, up and down scroll keys 74 and 76 respectively. Hard function keys 78 can be included, for example, to call up a calendar, telephone list, shopping list, and notes associated with the shopping list. One or more touch keys 80 can be provided for purposes of custom applications to allow a soft function approach to interactive program inputs. A separate bar code activation button 82 can be used to trigger bar code reading while an additional button 84 can be provided to initiate data transfer on docking in either of cradles 24,30. A region 86 can be provided for purposes of communication via optical character recognition, for example, using the so-called "Graffiti Alphabet" of the Palm Computing Palm Pilot Device.

Portable terminal 40 can also include a speaker 88 for supplying audible messages to the user. Speaker 88 can also beep when a bar code has been successfully read, and can beep a different tone or pattern of tones when scanning has not been successful. Terminal 40 can further include a position-sensing module 90 for sensing the position of the user within the shopping establishment 14 and for communicating with the user via the display 72 (or otherwise) when the user has deviated from an optimal shopping path in the shopping establishment 14. Module 90 can also be used to alert the customer to specials in their area to alert customers to list items in their area. When speaker 88 is present, the communication with the user can be audibly through speaker 88. Module 90 can interface, for example, with a GPS or similar system. Alternatively, various receivers can be located throughout shopping establishment 14 to sense the presence of user carrying terminal 40, as is known in the art of patient monitoring for hospitals. Further details will be provided below regarding the user's path through the shopping establishment, in a discussion of the method of the present invention.

Terminal 40 can include a suitable power source 92, for example, suitable dry cell batteries. Further, a control module 94 can be provided to drive the display 72 and to control the operation of the various other components of terminal 40.

The above-described portable terminal 40 can be formed by adding a suitable two-way data interface 42 (and optional buttons 82, 84), as well as other herein-described components, to the well known Palm-Pilot device manufactured by Palm Computing.

Figure 6:
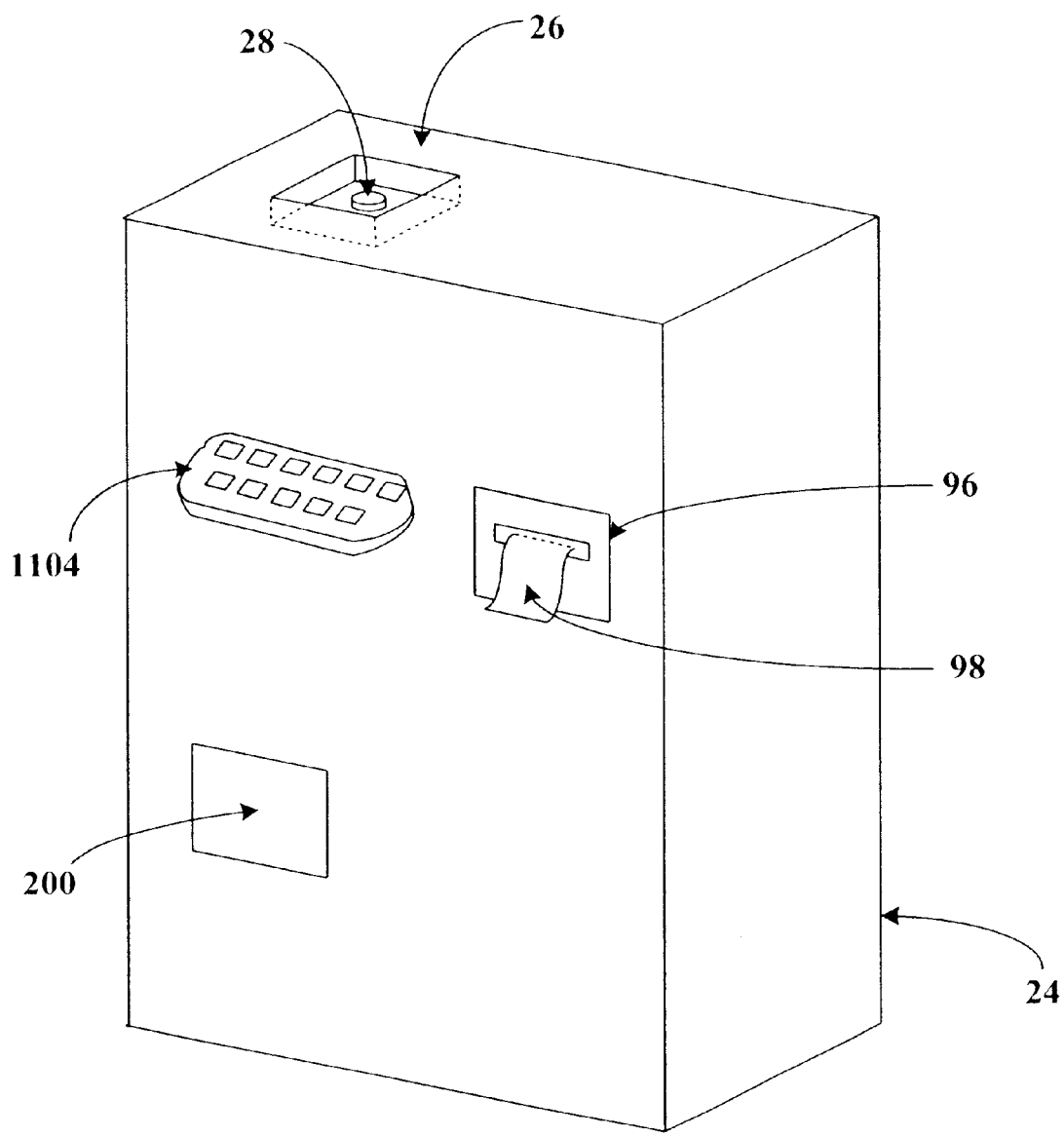
FIG. 6 is a perspective view of a shopping establishment kiosk cradle of the present invention.

Referring now to FIG. 6, kiosk cradle 24 includes kiosk portable terminal-receiving station 26 and kiosk optical interface 28. A printer 96 may be provided and can be used to print out a hard copy shopping list 98 in response to information in the shopping list database. Printer 96 can also provide recipes, nutritional information and/or coupons. A display 200 can also be provided. A keyboard 1104 can be provided for entering a PIN.

It will be appreciated that the present invention can comprise the assembly of all the aforementioned components. However, the invention also contemplates a home station comprising the above-mentioned home cradle 30 and portable terminal 40 only. Home cradle 30 would normally remain within the home of the user, while portable terminal 40 is portable between the home and shopping establishment 14. Yet further, the present invention also contemplates the personal shopping system portable terminal 40 by itself.

The present system can be employed with a telephone 100 of a user, having an ordinary touch-tone key pad, and associated with the user's home 12, for purposes which will be discussed fully below.

Figure 7:
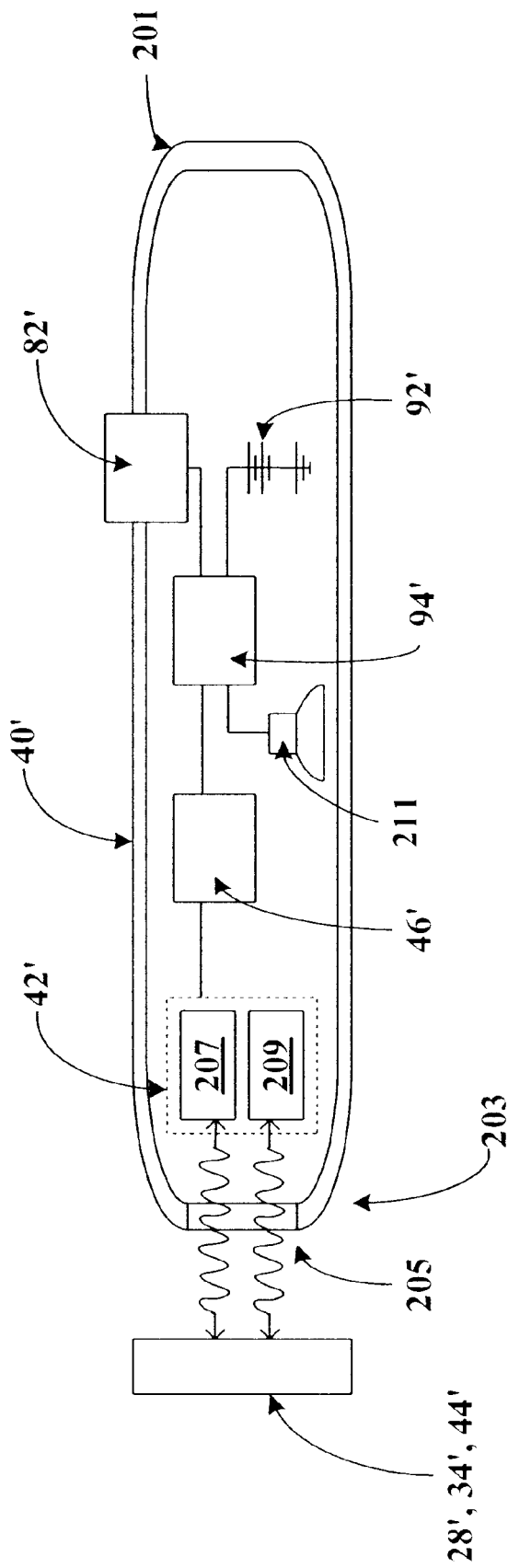
FIG. 7 is a side semi-schematic cross-sectional view of a second embodiment of portable terminal of the present invention.
Figure 8B:
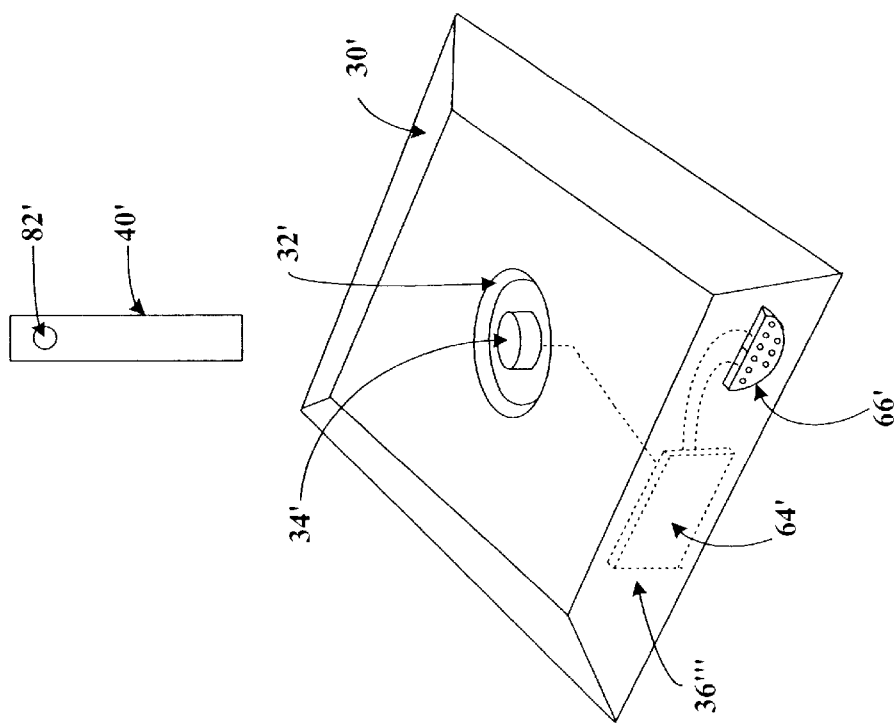
FIG. 8B is a fourth embodiment of home cradle for use with the second embodiment of portable terminal of the present invention.
Figure 8A:
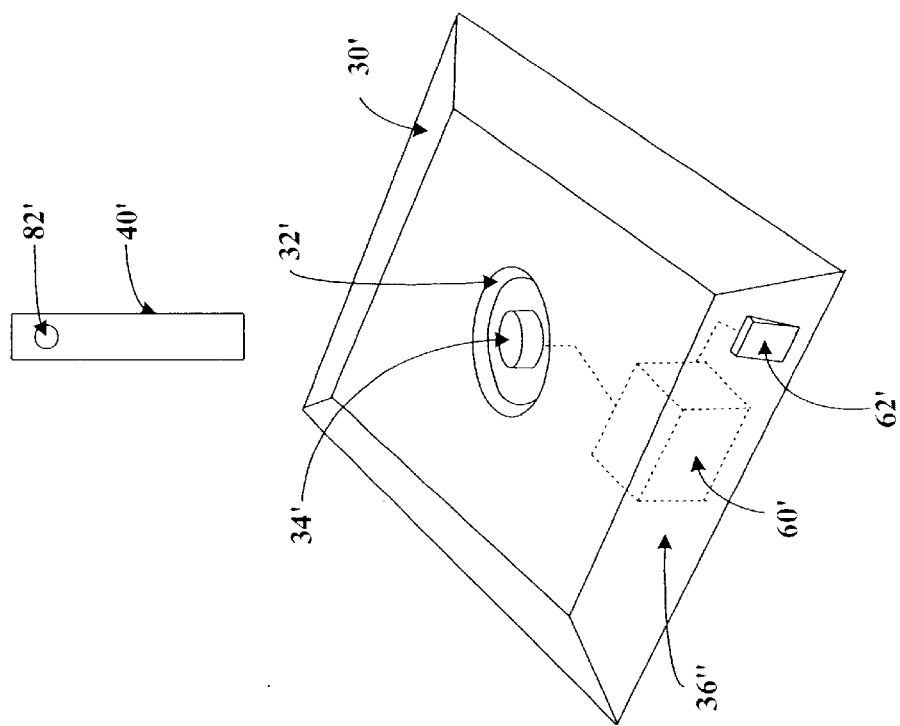
FIG. 8A is a third embodiment of home cradle for use with the second embodiment of portable terminal of the present invention.

With reference to FIGS. 7, 8A and 8B, an alternative embodiment of portable terminal 40' in accordance with the present invention will now be described. Items similar to those described above for the first embodiment 40 have received the same reference character but with a "prime" following it; item 36" corresponds to item 36 and item 36'" corresponds to item 36'. Alternative portable terminal 40' is generally pen-shaped, and has an elongate pen-shaped housing 201 having an end 203 with an optically transparent passage 205 therethrough. The memory 46' and the two-way terminal data interface 42' are arranged in the housing 201 with the two-way terminal data interface 42' positioned for communication (preferably optical) through the transparent passage 205. In any of the embodiments of the present invention, the two-way terminal data interface 42, 42' can include a light emitting diode 207 and a photodetector 209, employed in a manner well-known in other optical communication systems. Other types of data interfaces as discussed above can also be used in terminal 40'.

In a preferred alternative embodiment, the two-way terminal includes a laser bar code reader such as the SE-900 available from SymbolTechnologies, Inc. The user scanner is less than 0.3 inches wide and includes a scanning laser and a photodetector. Alternatively, other "miniaturized" scanners can be employed depending on the preferred size and economic preferences.

Alternative embodiment 40' can also include a trigger 82' for triggering reading of bar codes located on shopping-related items 44'. The trigger can be an inductive switch, push button or pressure sensitive pad area. This function can also instead be automatic, e.g., upon "swiping" an item 44, wherein the swiping can be automatic or user performed. A speaker 211, or other "beeping" device, can also be provided as above. Note that the kiosk data interface 28', home data interface 34', and shopping-related items with bar codes 44' are all represented by the same rectangle in FIG. 7, as they were above in the first embodiment. Alternative embodiment 40' can also include a power source 92' and control module 94' as described above. The alternative embodiment 40' can have diameter of about ⅜ inches and a length of about 5–6 inches to permit convenient carrying and storage by a user, for example, in a pocket or purse like an ordinary pen, and can thus be configured for easy gripping by a user of the system. An example of such a pen is the "InfoPen" recently available from Symbol Technologies, Inc.

FIGS. 8A and 8B are entirely similar to FIGS. 5A and 5B above, except that the portable terminal-receiving station is shaped to receive the alternative embodiment of portable terminal 40'. It should be noted that wherever portable terminal 40 is discussed in this application, the discussion also includes alternative embodiment of portable terminal 40'. Certain features of portable terminal 40, such as the display, may not be most conveniently incorporated into portable terminal 40' due to its more compact shape; this will be apparent when reading the appropriate passage in this application.

Either embodiment of terminal 40, 40' can be combined with a cordless telephone as a convenience and also to use the wireless communication circuitry of the cordless phone for data interface purposes.

A method, according to the present invention, of placing an order for items including at least one of goods and services will now be described. The method includes the step of reading bar codes associated with the shopping-related items (i.e., goods and/or services) with a two-way data interface 42 of a portable terminal 40. The method further includes the step of storing data associated with the bar codes in a memory 46 of the portable terminal 40. The method yet further includes the step of transferring the data associated with the bar codes to a host computer 16 for storage in a shopping list database. The transferring step includes the sub-steps of transferring the data associated with the bar codes from the memory 46 of the portable terminal 40 to the two-way terminal data interface 42 of the portable terminal 40; and then transferring the data associated with the bar codes from the two-way terminal data interface 42 to an data interface of either the kiosk portable terminal-receiving station 26 or the home portable terminal-receiving station 32; and then to the host computer. As described above with respect to the apparatus, the kiosk portable terminal-receiving station is part of the shopping establishment kiosk cradle 24 which is coupled to the host computer 16.

The home portable terminal-receiving station is part of the home cradle 30 which is associated with the home 12 of the user and is also coupled to the host computer 16. When the portable terminal 40 is used in the home, the data associated with the bar codes will be transferred to the data interface 34 of the home portable terminal-receiving station 32. In this case, the inventive method can include the additional steps of reading a bar code on a shopping-related item 44 which is a special bar code associated with a shopping establishment 14, using the two-way data interface 42 of the portable terminal 40. In response to the reading of the special bar code, home cradle 30 can automatically contact the shopping establishment 14 when the portable terminal 40 is placed in the home portable terminal-receiving station 32 of the home cradle 30. The contacting is done on the basis of information encoded in the bar code associated with the shopping establishment 14.

The method of the present invention can also include the step of transmitting identifying indicia, for example, intrinsic identifying indicia which may be contained in the terminal 40, from the portable terminal 40 to the host computer 16 to identify the user to the host computer, as discussed above with respect to the apparatus. The method can also include the additional step of displaying relevant portions of the shopping list database, discussed above, on the display 72 of the portable terminal 40.

When portable terminal 40 is used in the home 12, and the data associated with the bar codes is transferred to the data interface 34 of the home portable terminal-receiving station 32, host computer 16 can send at least one verification query to home cradle 30 in order to verify at least one of correctness and validity of an order which is based on the shopping list database. The step of sending the verification query can include sending the verification query as a human language audible query to the telephone 100 which is coupled to the home cradle 30. Additionally or alternatively, the step of sending the verification query can include sending the verification query as a signal which triggers visual display of the verification information on display 72 of portable terminal 40. The verification query process can also include caller identification to prevent theft of goods and/or services. If the "caller ID" does not match the telephone number associated with the authorized user's home phone, e.g., the transaction could be denied. The home phone would normally in turn be associated with the authorized user's home portable terminal-receiving station. Further, the user can be prompted to enter a personal identification number (PIN) to supplement, or in lieu of, identifying indicia in the terminal 40 itself. The PIN can be entered on the keypad of telephone 100, separate home PC 68, or a keypad (not shown) on home cradle 30. A display could also be provided on home cradle 30 for use with terminals 40', e.g., which might not have a display.

Still referring to use of terminal 40 in the home 12, when using the alternative embodiment of data transfer circuit 36' discussed above, the data associated with the bar codes is transferred from the home portable terminal-receiving station 32, through a suitable interface card 64, to a separate home personal computer 68 of the user, and then through a home modem 70 to the host computer. In this case, the method can include the additional steps of sending at least one verification query from the host computer 16 to the separate home computer 68, and then responding to the at least one verification query with at least one response emanating from the separate home computer 68.

In an alternative preferred embodiment, the home computer includes a price lookup table, prior shopping lists, recipes including UPC or other scanning data for ordering and other functionality. The PC is assumed to have greater memory and peripheral devices such as a CD reader. This would enable a retailer to provide CD or other data files which can provide greater consumer applications and data manipulation prior to transfer to a host.

It will be appreciated that the audible and computer related approaches are preferred when using the portable terminal 40' which may be too small to have a display. Or in special uses, large screens with large fonts could be used to aid impaired consumers.

Method steps associated with use of portable terminal 40 in shopping establishment 14 will now be described. It is to be appreciated that when portable terminal 40 is used in shopping establishment 14, data associated with the bar codes scanned in the home 12 of the user is transferred to the data interface 28 of the kiosk portable terminal-receiving station 26. With reference to FIG. 6, the method can include the additional step of printing a hard copy shopping list 98 from the kiosk cradle 24, for example, with printer 96, in response to the data associated with the bar codes which were read in the home 12. It will be appreciated that a user of the system can simply check off data items listed on the hard copy shopping list 98 with a conventional ink pen as the items are picked up off the shelves 102 (see FIG. 4) of the shopping establishment 14 and scanned with the portable terminal 40. Thus, it will be appreciated that the method according to the present invention can include the method step of scanning new items required to be purchased, in the shopping establishment 14, with the portable terminal 40. The scanning can be in response to the hard copy list, or in response to one or more embodiments of electronic list. When an electronic list is employed, the method can include the additional step of updating the electronic list in the memory 46 of the portable terminal 40 to indicate that a given one of the required new items has been obtained. By "new items" is meant goods or services in the shopping establishment 14 which are desired by the user of the system. "New" is used to distinguish these items from the (presumably) old items which were scanned at home and which require renewal or replacement. A PIN can be entered on keyboard 1104 of kiosk cradle 24.

In a further method, a consumer generates a list of prepackaged items and downloads the information onto a kiosk. These goods are confirmed for purchase and subsequently collected either in the back room warehouse or by an attendant within the store for pick up by the consumer. The consumer may, in the meantime, collect perishable goods which might be subject to product variation, customer preference or simply selective customer shopping, i.e., meats, vegetables, fruits and candies. The customer would be provided a customer order of completion time and location by either a public address system, beeper, or if equipped with a wireless radio, through his or her terminal. The customer would then proceed to a payment register and pay for new items, which could be prescanned with the terminal and automatically downloaded to the register, and previously ordered items. Such an ordering process could also be implemented from home with the proviso that a customer would need to include pickup/drop-off requirements.

In yet another preferred method, a host or home computer generates a list of ingredients, i.e., shopping list, according to one or more recipes and downloads the list onto a kiosk and/or a portable terminal. Goods corresponding to the ingredients are confirmed via a portable terminal for purchase and subsequently collected either in the back room warehouse or by an attendant within the store for pick up by the consumer. The consumer may also modify the list of ingredients at the portable terminal, for example, to add perishable or seasonable goods which might be subject to price variation, customer preference or simply selective customer shopping, i.e., meats, vegetables, fruits and candies. In addition, the list can be further modified by a servings multiplier, which would modify the quantity of certain or all of the ingredients according to anticipated quantities to be served. Again, such an ordering process can also be implemented from a home personal computer.

When using a portable terminal such as pen-type terminal 40', which may not have a display, a user can simply periodically re-dock terminal 40' in kiosk 24 to check the updated electronic list, for example, to print a revised list with scanned items "crossed off," or to view a revised list on optional display 200 of kiosk 24. If the list is presented it could also include bar codes (or a single high density code) for automatic reprocessing into another kiosk or register.

Either the hard copy or electronic shopping list can be produced as an optimized shopping list in response to the shopping list database and information contained in the host computer 16 about location of the items within the shopping establishment 14. The optimized shopping list can be ordered to direct the user through the shopping establishment 14 in an efficient path. For example, with reference to FIG. 4, user 58 can be directed along the path 104 symbolized by dashed lines so as to move sequentially through shelves 102 of establishment 14. Items on the shopping list can be printed out in an order in which they will be encountered when user 58 travels efficient path 104. The optimized shopping list can also offer specials pertaining to items on the list.

To further enhance the efficiency of the user's shopping experience, the method can include the additional step of sensing the location of the portable terminal 40 with the position-sensing module 90. This position presumably corresponds to the position of user 58 within the shopping establishment 14. In this case, the method can include the additional step of communicating a message advising the user 58 when the user 58 has deviated from the efficient path 104. This message could be generated by wireless communication from host computer 16 to portable terminal 40, or could be generated otherwise; for example, within terminal 40 in response to downloaded information regarding location of goods. Still referring to FIG. 4, when user 58 embarks upon an inefficient path 106, symbolized by dash-dotted lines, a message can be sent to the user 58 to indicate that he or she should traverse the one of the shelves 102 which would have been missed in taking inefficient path 106. More preferably, the list can be re-optimized with new directions based on the user's new location. The communicating step can optionally include an audible communication using speaker 88 of portable terminal 40. One of the previously-discussed keys on portable terminal 40 can be programmed as an interactive marketing help key to alert shopping establishment personnel to the customer's location.

Memory 46 and control module 94 of portable terminal 40 can be suitably programmed such that memory 46 remembers the one hundred (for example) most frequently purchased products of the user. These one hundred most frequently purchased goods or services (or any other desired number) can be stored in the memory 46 as, for example, a "customer preference file" and can be updated on a continuous basis as the user's preferences change. Further, the user can also have the capability of generating a custom list of frequently-ordered or other desired items. Price and other information associated with the frequent items can be updated, for example, whenever portable terminal 40 is in communication with host computer 16. Different lists can be maintained for each of a variety of shopping establishments. Further, customer preference files can be uploaded to host 16 at any convenient time, e.g., automatically whenever terminal 40 and host 16 communicate (downloads, to update price (for example) could also be performed at this time). Many of a wide variety of customer preferences could be stored (e.g., vegetarian, health food). Additional details on database management are provided in the aforementioned U.S. patent application Ser. No. 08/866,690 the disclosure of which has been previously incorporated herein by reference.

The aforementioned verification queries can include, for example, final price and confirmation of the user's order including price, delivery or pick-up, and desired time. While this information can be sent by voice to telephone 100, it can instead be sent in written form to display 72 of portable terminal 40, or to separate home computer 68, in order to save time for the user.

The storing step of the method can include storing data pertaining to a given shopping establishment, and can include the additional steps of repeating the reading step for items associated with another given shopping establishment, and repeating the storing step for the items associated with the other given shopping establishment, such that multiple lists of item for at least two different shopping establishments are stored in the personal terminal.

It will be appreciated that shopping establishment 14 could be, for example, a retail store or a warehouse. Telephone lines 22, 38 can be employed for dual tone multi frequency (DTMF) communication among any of the components of the system. As noted, the phone lines 22, 38 can be public or private or a satellite system.

The user can scan the bar codes of shopping-related items 44 in home 12 all at one time, or as items are used up and thrown away. When ordering from home, the consumer can order just the goods scanned, or can edit information in memory 46 of terminal 40 to customize the order. Portable terminal 40 can then be placed in the portable terminal-receiving station 32 of home cradle 30. Before this placement, as noted above, a shopping-related item 44 containing a special bar code with information about an establishment from which the order is to be placed can be scanned. This could be a card with a bar code and there could be separate cards for each given shopping establishment, such as the drug store, flower shop, grocery store, auto parts store, etc. The card for each of these locations could also include an identification and/or password. As noted, the identification could also be permanently stored in portable terminal 40. For a portable terminal 40 with no display, such as, e.g., 40', editing can be carried out with terminal 40' docked in home cradle 30 via interaction with home computer 68. Separate files for each of a number of shopping establishments can be created in the memory 46 of portable terminal 40. Memory 46 can thus be configured to store multiple lists of data associated with the bar codes, as multiple shopping lists corresponding to multiple shopping establishments. Communication with the appropriate shopping establishment can be indicated by first "swiping" the id card for that shopping establishment. Other files in the memory would not be affected (e.g. florist file not affected by auto parts order). Alternatively, the customer card could be a credit card which the customer may associate with a single or multiple retailers.

Once the user has scanned the appropriate card for the given location where the order is to be placed, portable terminal 40 is placed in home cradle 30 and cradle 30 then "dials up" the appropriate shopping establishment 14. At this time, if desired, the user can also pick up the handset of telephone 100. Portable terminal 40 can download the entire shopping list to the host computer 16 at once, or can send one item at a time. In the item-by-item mode, the host computer 16 can respond to each item with a digitized voice setting forth the quantity of the item to be ordered and its description and size, and can then prompt the user to, for example, push the pound sign (on the telephone keypad) to confirm or the star sign to enter another number. This can be repeated until the entire shopping list is downloaded to host computer 16. Further, host computer 16 can also prompt the user to enter the desired delivery time, complete a survey, and the like via the key pad of telephone 100. This interaction could also instead be carried out using the display 72 of portable terminal 40 or using the home computer 68.

When the user instead wishes to travel to shopping establishment 14 to shop, they can dock the portable terminal 40 in the kiosk cradle 24. The appropriate shopping list in memory 46 is then downloaded and stored in the database in host computer 16. As noted in the discussion of the method, the user can print the hard copy of the order and check items off with an ink pen as they are scanned with portable terminal 40 and deposited in, for example, a shopping cart of the user. Again as noted, the list can be imported as an electronic list with items automatically checked off as they are scanned, as discussed above. Further, the aforementioned optimized shopping list, either in electronic or hard copy form, can be generated. It should be noted that the user can be provided with the option to scan additional items not on the list, for example, in response to impulse purchases and the like.

When the position-sensing module is employed, the message sent to the user could be as specific as prompting the user to go back to a given shelf and to remind them which product on that shelf they forgot to purchase or to otherwise delete the item from the list.

Once the user has finished picking up the items they wished in shopping establishment 14, they can be "checked out" at one of the point of sale check out terminals 56 in a manner similar to current computer-aided shopping systems. That is, they can present the computerized list and simply tender payment, with occasional auditing to ensure integrity of the system. The shopping list can be up-loaded to terminal 56 and printed.

The present invention can also be employed by store personnel who are picking a home-placed order which is already in the database of host computer 16. An appropriate billing transaction can then be completed at any point in time by any associate in the shopping establishment 14, whether it be when the user comes to pick up the order, or before or after the order is shipped to the user.

Figure 10:
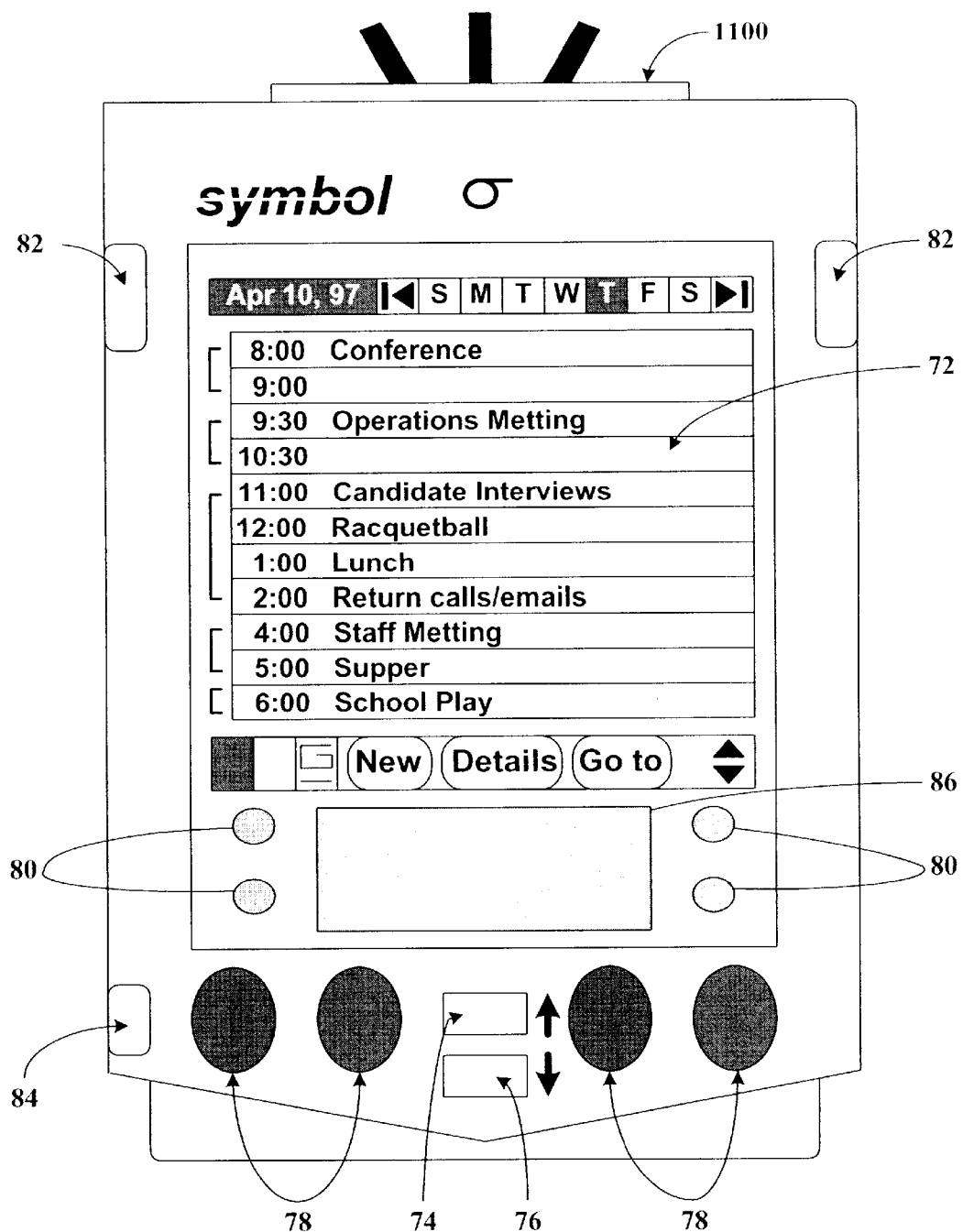
FIG. 10 is a fourth embodiment of the portable terminal of the present invention.

FIG. 10 shows a fourth embodiment of the portable terminal of the present invention. This embodiment is similar to the embodiment of FIG. 9A, but in addition includes two bar code activation buttons 82 disposed on the left and rights of the terminal each for triggering bar code reading by the user. As shown, two bar code activation buttons 82 disposed on the two sides the terminal housing allow the user to simultaneously view the terminal display while viewing the visible light source upon activation of the bar code scanner.

Figure 11:
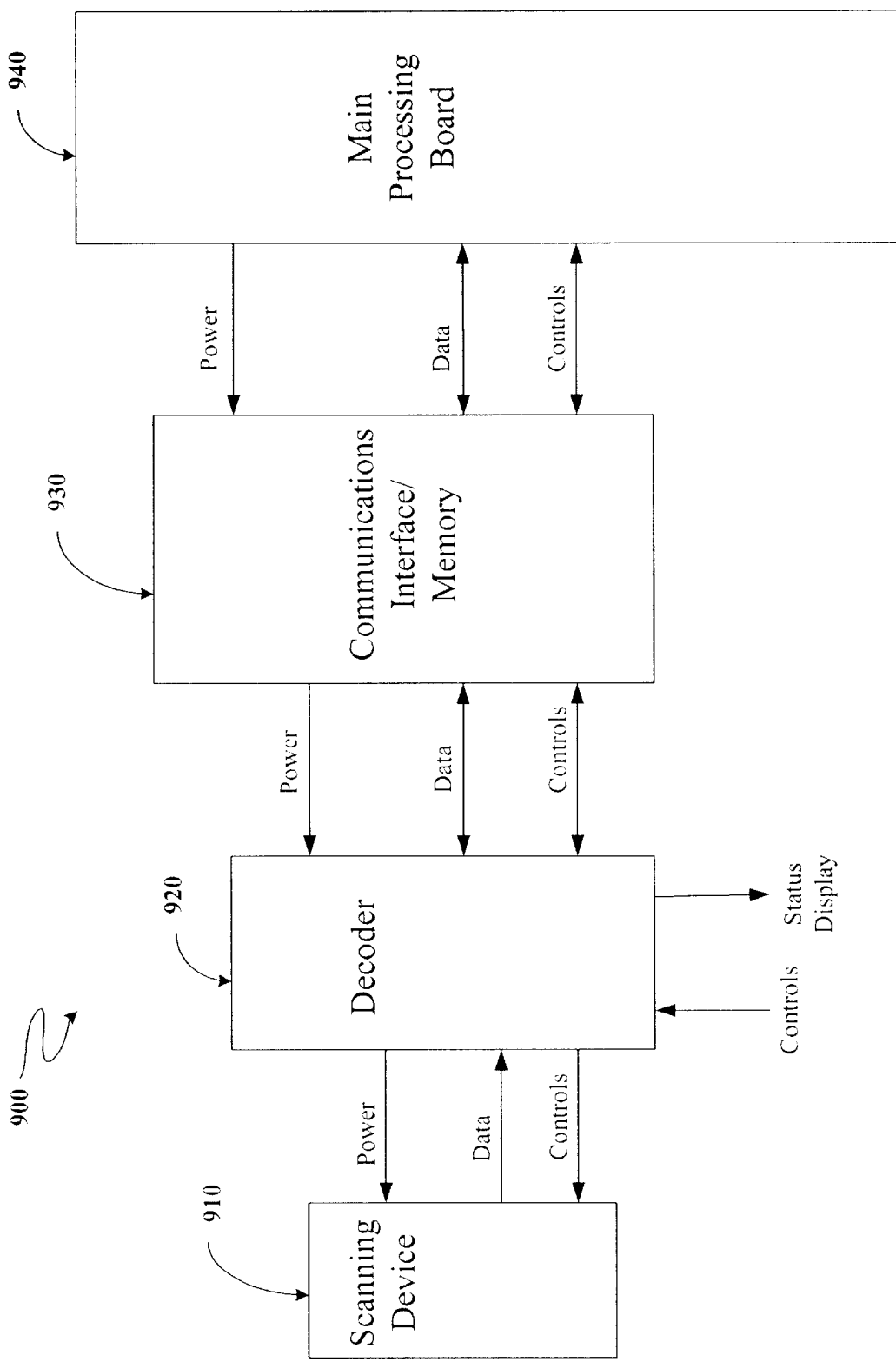
FIG. 11 is a block diagram showing a first embodiment of a portable terminal hardware architecture in accordance with the present invention.

FIG. 11 shows a high-level block diagram of the hardware architecture for the portable terminal of the present invention. The portable terminal includes a scanning device 910 for reading bar code, a scanner decoder 920 coupled to the scanning device 910, a communications interface/memory board 930 coupled to the scanner decoder 920, and a main processing board 940 coupled to the board 930. Further details of the hardware architecture are described with reference to the detailed architecture 901 shown in FIG. 12.

The scanning device 910 is used for reading bar code data from any coded product or item, and for generating a corresponding digital bar code pattern. According to the present embodiment, the scanning device can be any suitable laser or CCD scanner, for example, and is preferably the SE-900 laser scanner available from Symbol Technologies, Inc. The scanning device outputs Digital Bar Code Pattern (DBP) and a Start of Scan (SOS) signals to the scanner decoder 920. Further, the scanning device is activated and configured into various modes of operation in accordance with control data provided by the decoder 920. Typical control data may include the Laser Enable, Scan Enable and Configuration commands shown in FIG. 12.

Figure 12:
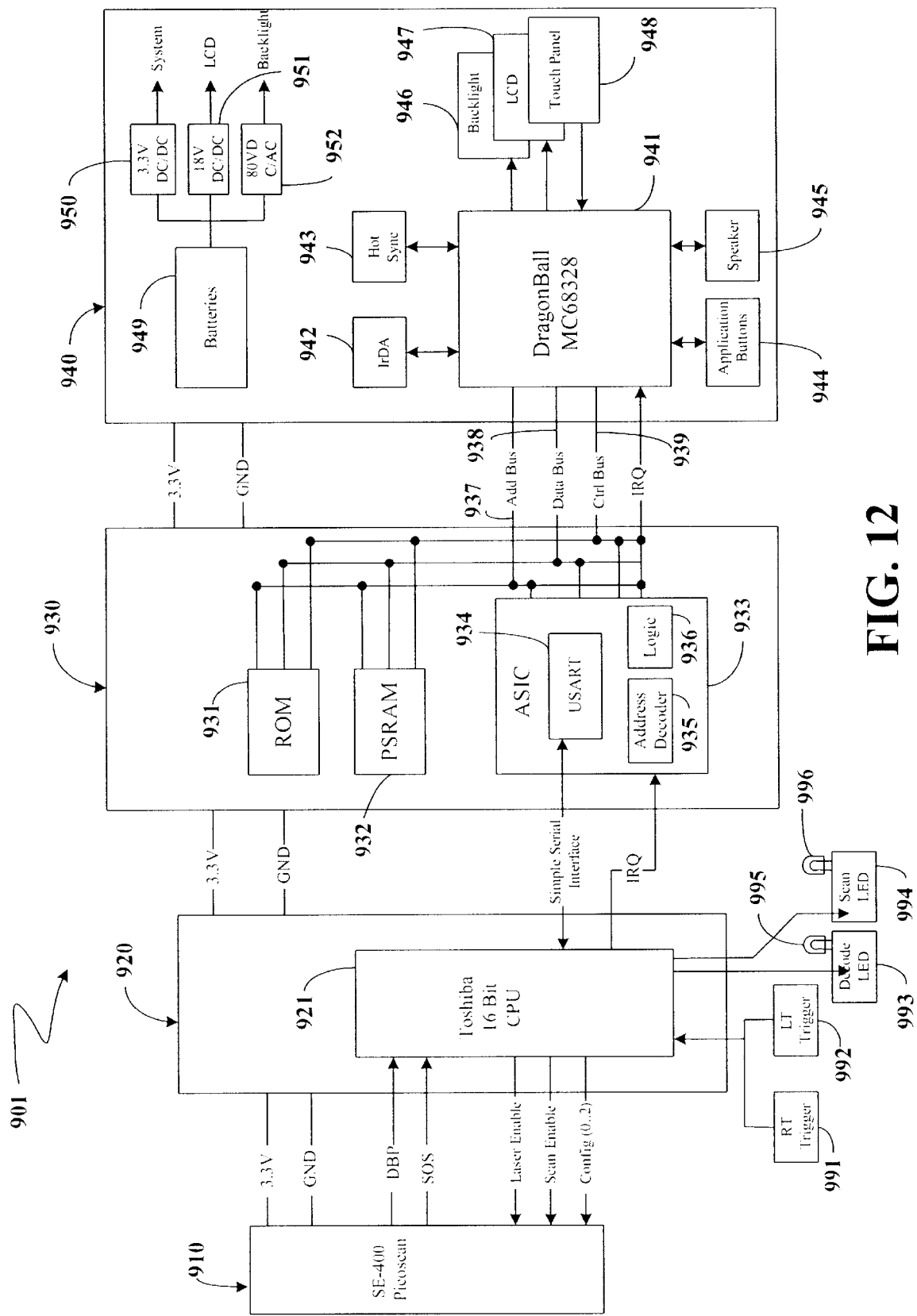
FIG. 12 is a block diagram showing in detail the hardware architecture of FIG. 11.

The scanner decoder 920, which interprets the DBP and the SOS data and generates corresponding serial decoded data, is capable of interpreting any number of bar code types, and may be any suitable processor such as the Toshiba 16-bit processor shown in FIG. 12. Right and left trigger buttons, such as the bar code activation buttons 82 of FIG. 10, are used to generate the necessary control signals to initiate scan by the scanning device 910. Signals indicating the "decode" and "scan" status are in turn provided so as to illuminate indicator devices such as LED's 993 and 994. Interrupt signal IRQ is also provided by the decoder 920 to the communications interface 930.

Communications interface 930 is used to convert the decoded bar code data for further processing by a microprocessor included in the main processing board 940. Preferably, as shown in FIG. 12, the communications interface 930 includes an Application Specific Integrated Circuit (ASIC) or gate array 933 that includes a serial-to-parallel converter for converting the serial data stream provided by decoder 920 to parallel data for processing by the microprocessor 941 of the main processing board 940. The ASIC includes a Universal Synchronous Asynchronous Receiver-Transmitter (USART) 934, an address decoder 935 and a logic device for selecting the interrupt for the USART. In accordance with the preferred embodiment of FIG. 12, the communications interface 930 further provides an interrupt signal IRQ to the microprocessor 941 and includes ROM, PSRAM or equivalent memory devices for storing a terminal operating system, terminal application programs and related data.

Microprocessor 941, preferably a DragonBall MC68328 microprocessor, is provided for processing the converted decoded bar code data, executing the terminal operating system and terminal applications, e.g., personal organizer/calendar, Internet browser, etc., and generally for controlling the overall operation of the terminal device. The microprocessor 941 further includes in turn an interface for coupling to a touch sensitive display, which itself includes a backlight 946, LCD 947 and touch panel 948. One or more interfaces 944 are further provided for receiving user-activated function commands, along with a synchronization port 943 for automatically synchronizing the terminal to a host computing device. The microprocessor 941 also includes an infrared link 942 and interface to a speaker device 945.

Figure 13:
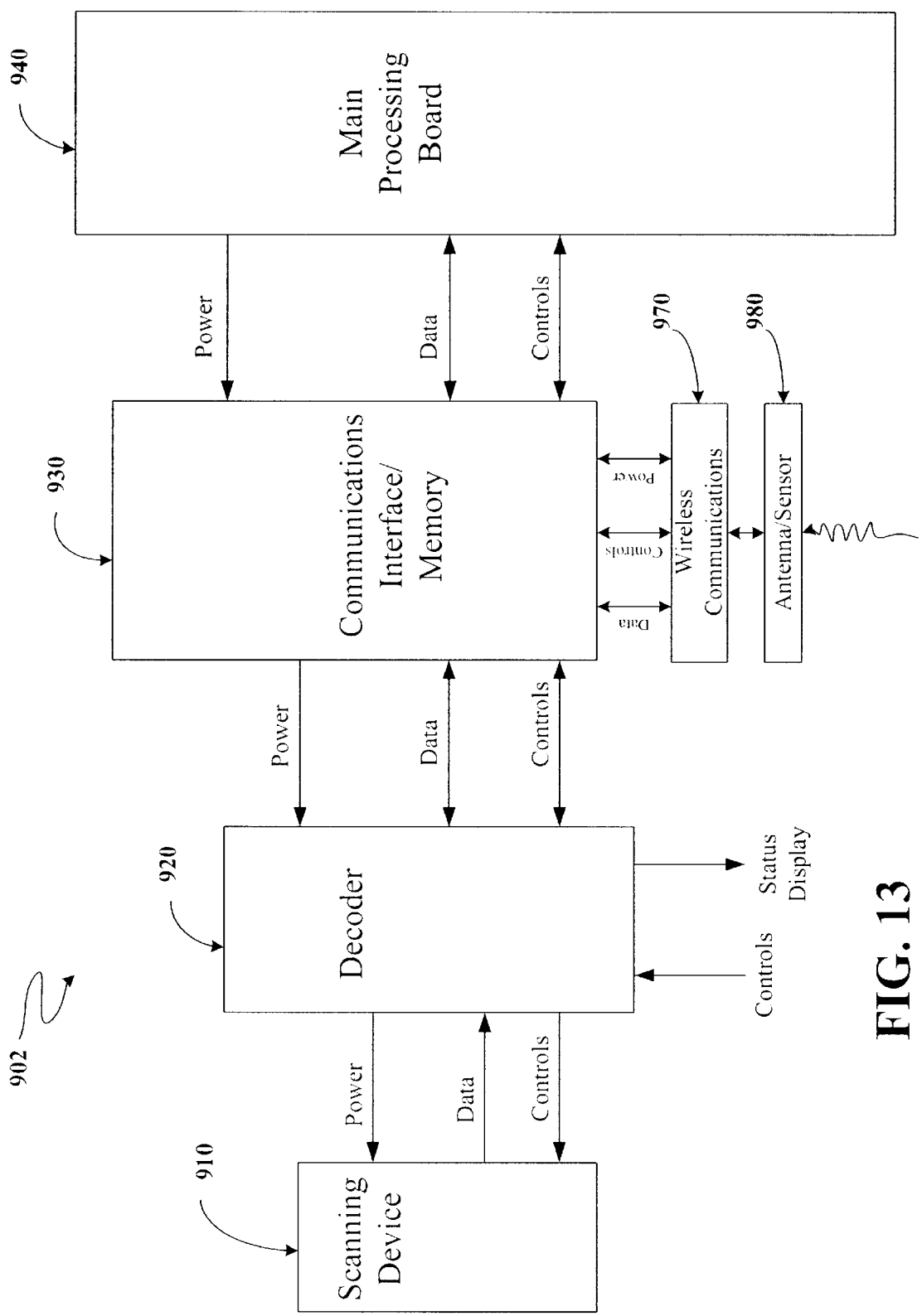
FIG. 13 is a block diagram showing a second embodiment of a portable terminal hardware architecture in accordance with the present invention.
Figure 14:
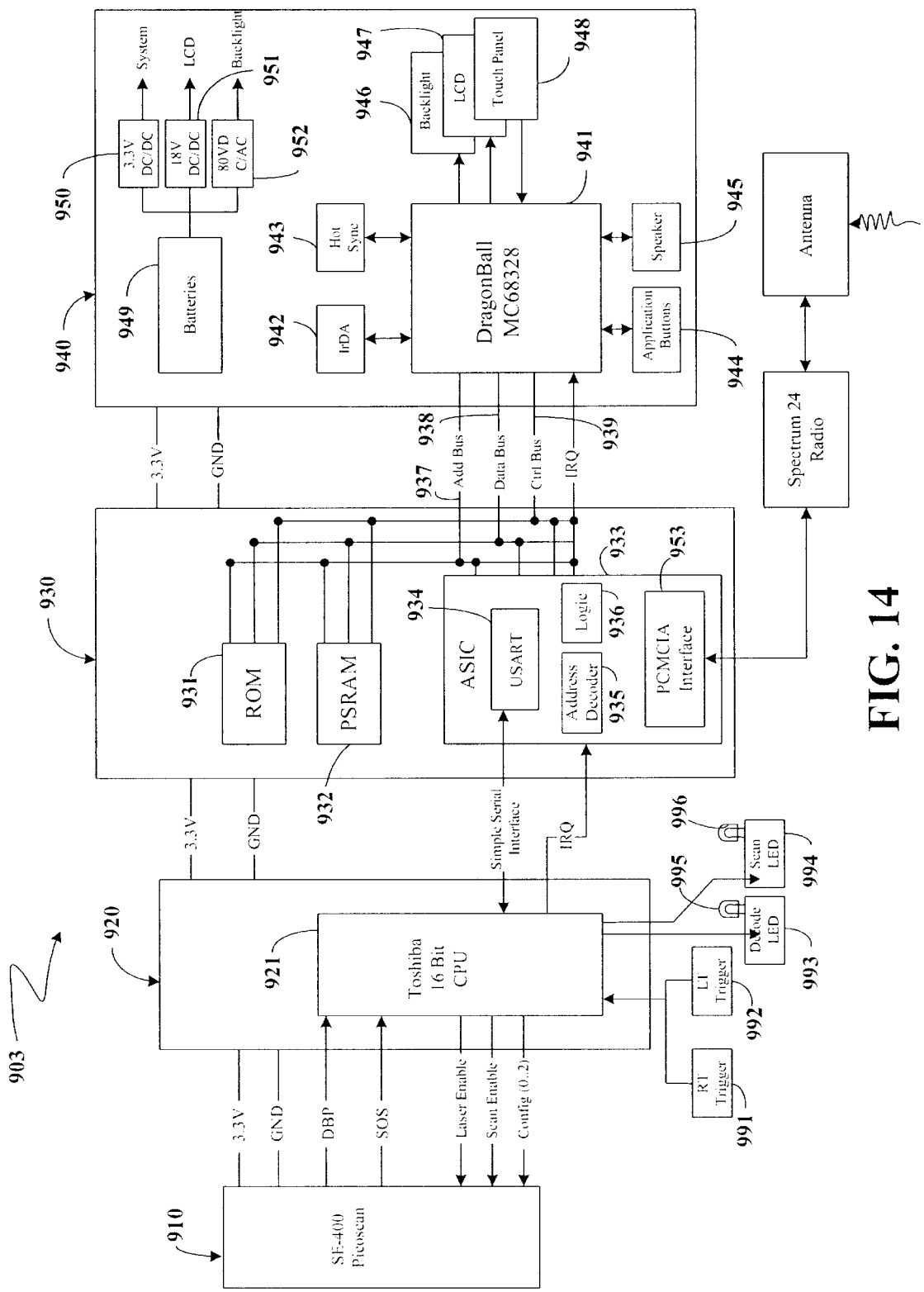
FIG. 14 is a block diagram showing in detail the hardware architecture of FIG. 13.

FIG. 13 is a block diagram showing a second embodiment of a portable terminal hardware architecture in accordance with the present invention. The embodiment of FIG. 13 is a modified version of the embodiment of FIG. 12 wherein a wireless communications device 970 is coupled to the communications interface 930 and a corresponding antenna. As further shown in FIG. 14, the communications device 970 is the Spectrum 24™ radio, available from Symbol Technologies, Inc., which is coupled via a PCMCIA or equivalent interface 953 included in the ASIC 933. In an alternative embodiment, the portable device is inserted into a sled (not shown) that mates to the synchronization port 943.

In the event multiple users of terminals exist, it may be preferable to provide multiple cradles which are networked together or otherwise connected to a destination host.

Figure 15:
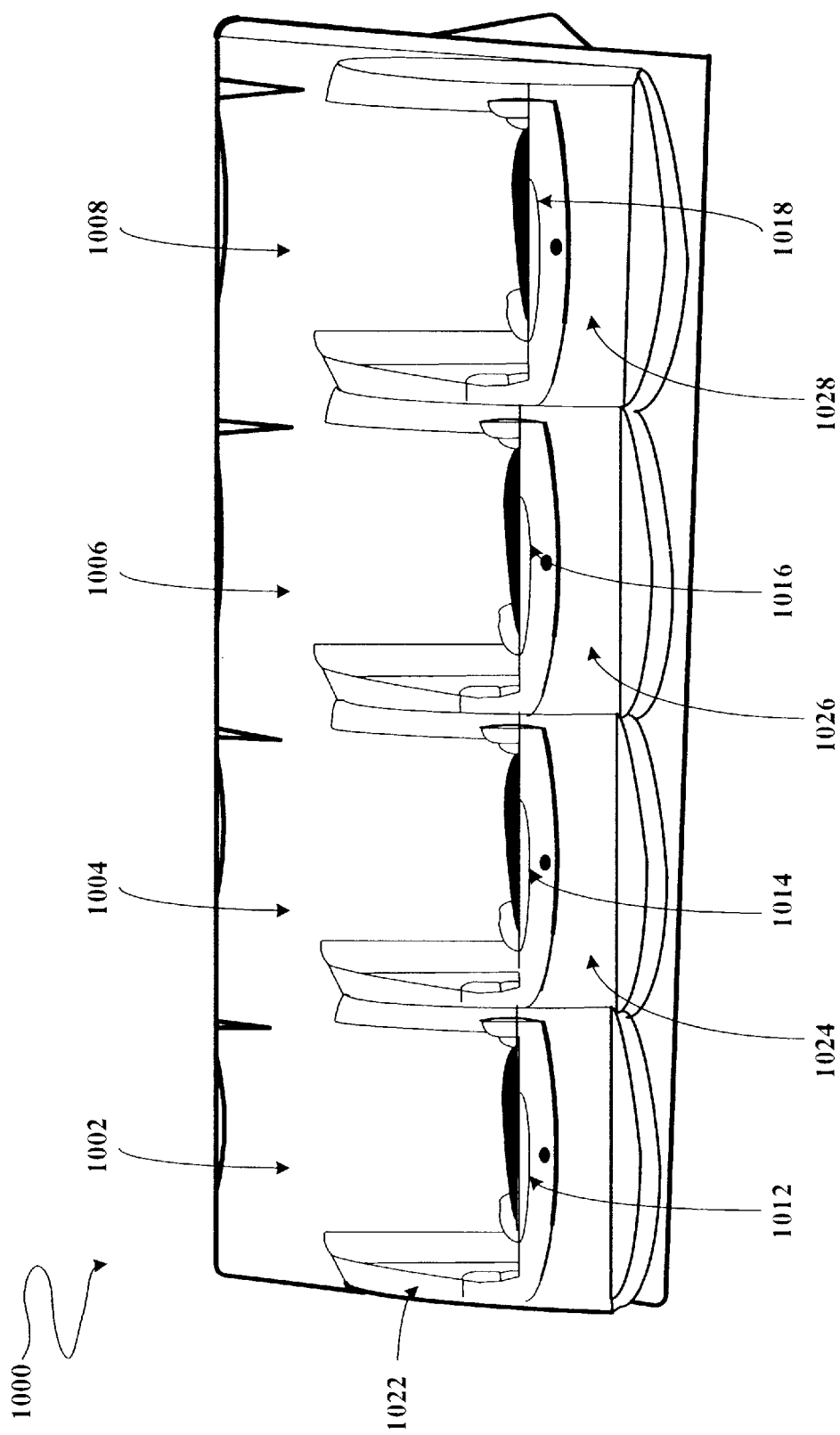
FIG. 15 is a front view of a preferred embodiment of a stackable cradle assembly of the present invention.

FIG. 15 shows a perspective view of a stackable cradle assembly 1000 according to a preferred embodiment of the present invention. As shown in FIG. 15, the present embodiment of the cradle is arranged and constructed for docking with one or more of the portable terminals of FIGS. 9A and 9B. The cradle 1000 of FIG. 15 is stackable and especially adaptable for use in shopping, warehousing, health care, service centers and packaging/trucking establishments.

Figure 16:
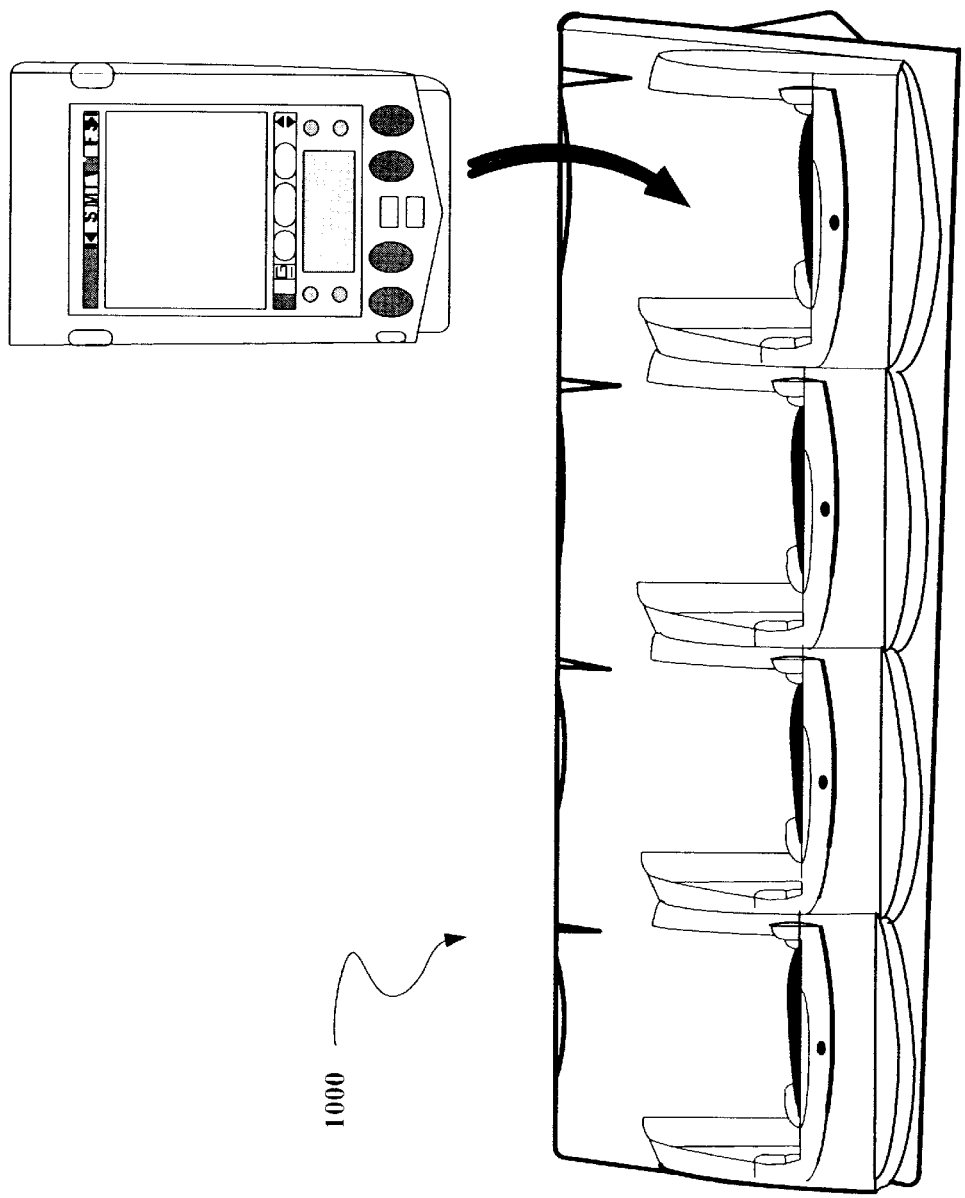
FIG. 16 illustrates the docking of a portable terminal with the stackable cradle of FIG. 15.
Figure 18:
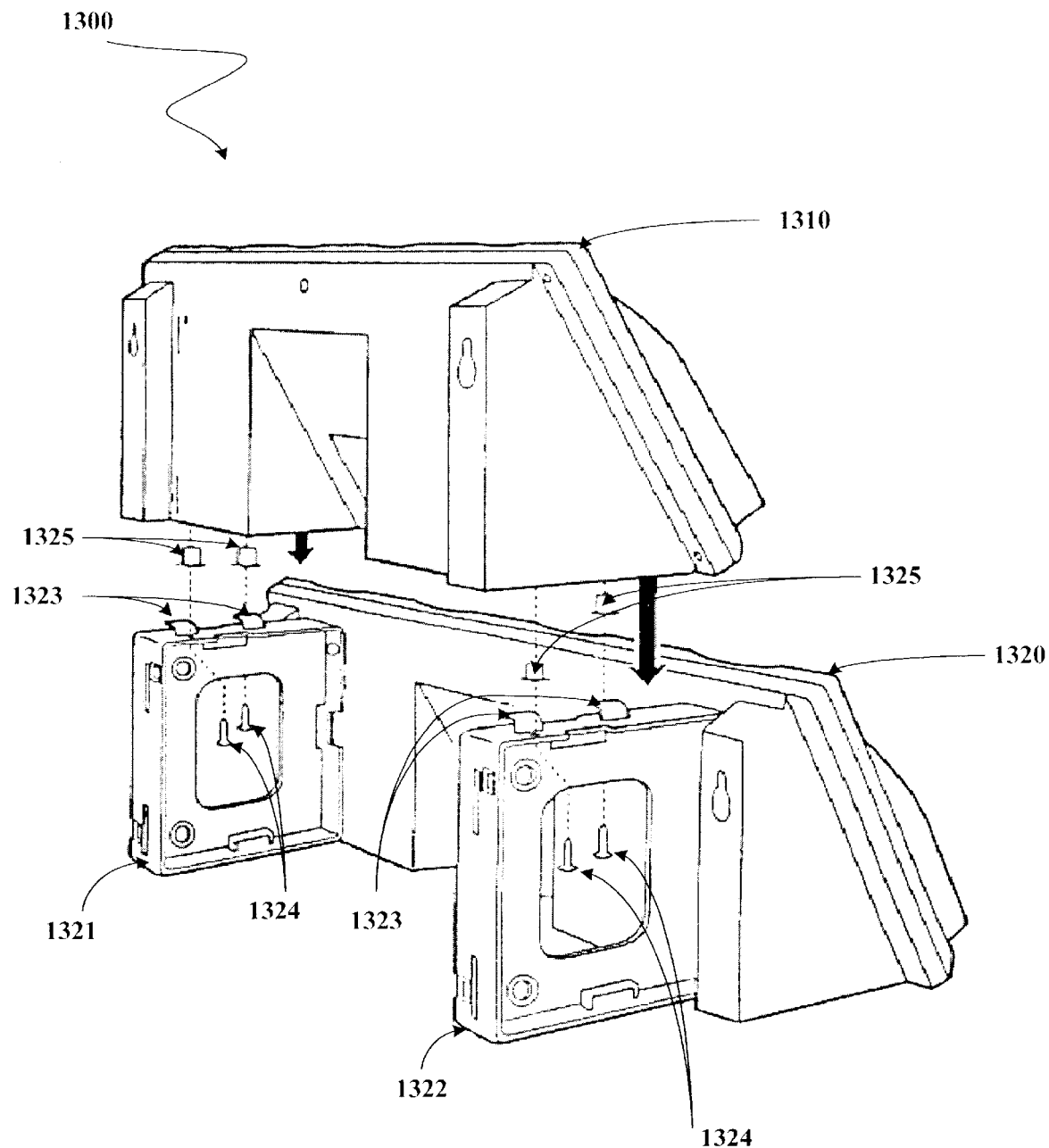
FIG. 18 illustrates a two-cradle configuration in accordance with the stackable cradle embodiment of FIG. 15.
Figure 19:
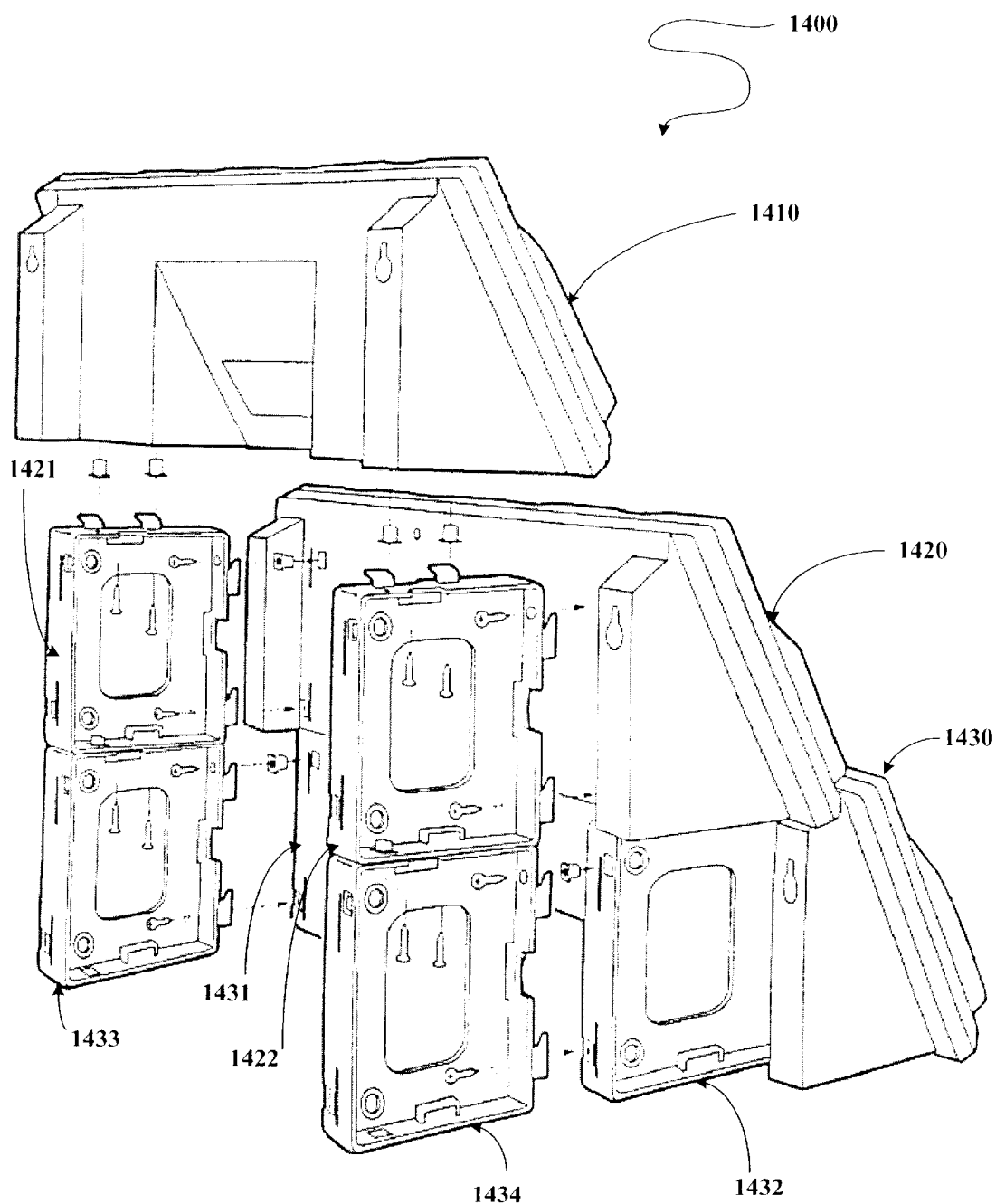
FIG. 19 illustrates a three-cradle configuration in accordance with the stackable cradle embodiment of FIG. 15.
Figure 20:
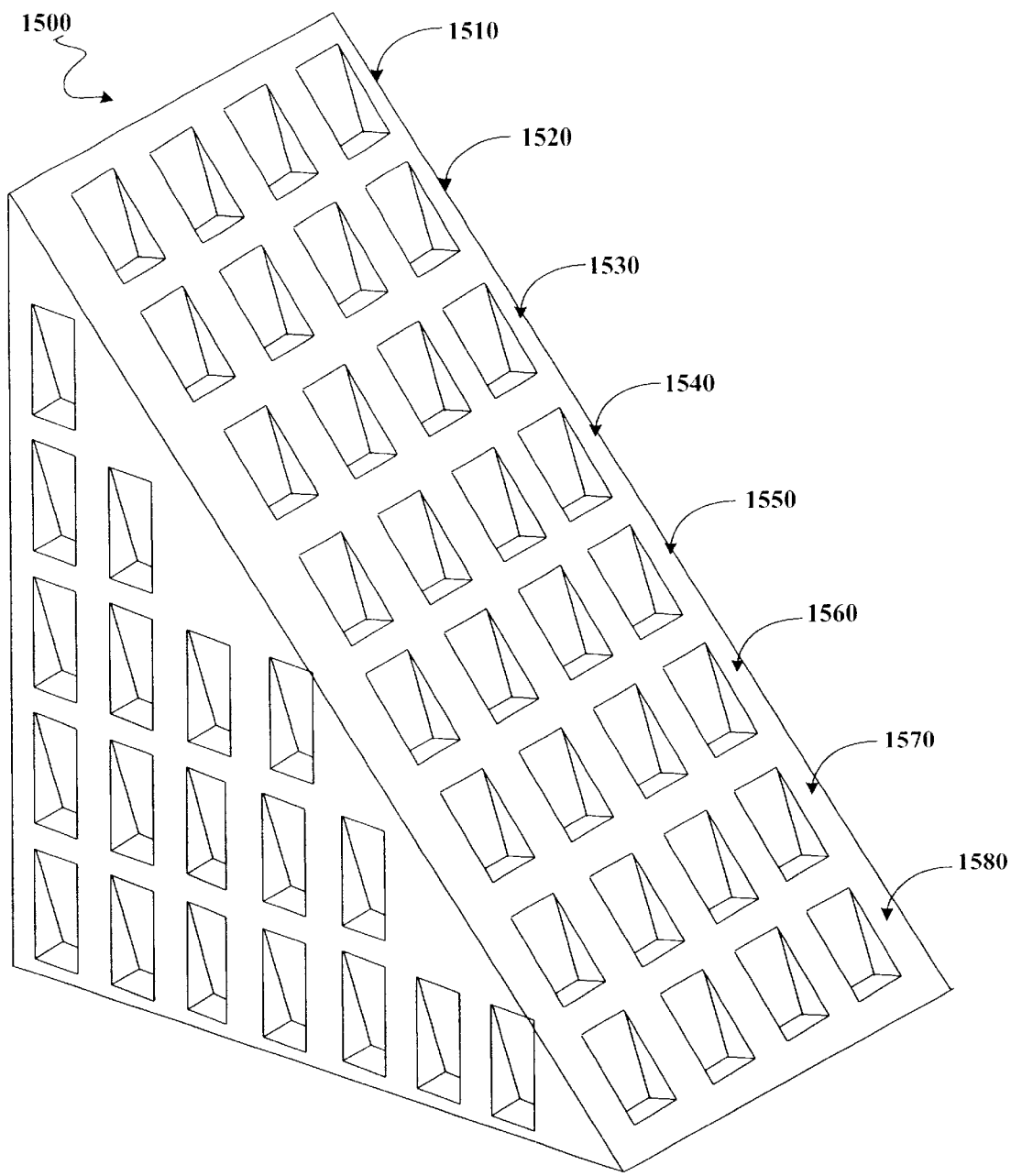
FIG. 20 illustrates an eight-cradle configuration in accordance with the stackable cradle embodiment of FIG. 15.

The present embodiment of the cradle 100 includes one or more docking stations 1002 through 1008 for linking one or more portable terminals to a host computer so that data may be transmitted between the terminals and the host computer. The number of docking stations in FIG. 15 is shown by way of example and not limitation. Each docking station 1002, 1004, 1006 and 1008 includes a cradle data interface 1012, 1014, 1016 and 1018, and means for supporting the portable terminals 1022, 1024, 1026 and 1028. Preferably, the cradle 1000 is constructed of sturdy, high impact plastic material which is molded at station to receive the portable terminals as shown in FIG. 16. The cradle 1000 may also include a communications interface board, a power supply interface, visual indicators and wall-mounting means. As shown in FIGS. 18–20, multiple cradles can be stacked, for example to a wall or on a table top or counter, to interconnect many portable terminals to a host computer.

Figure 17:
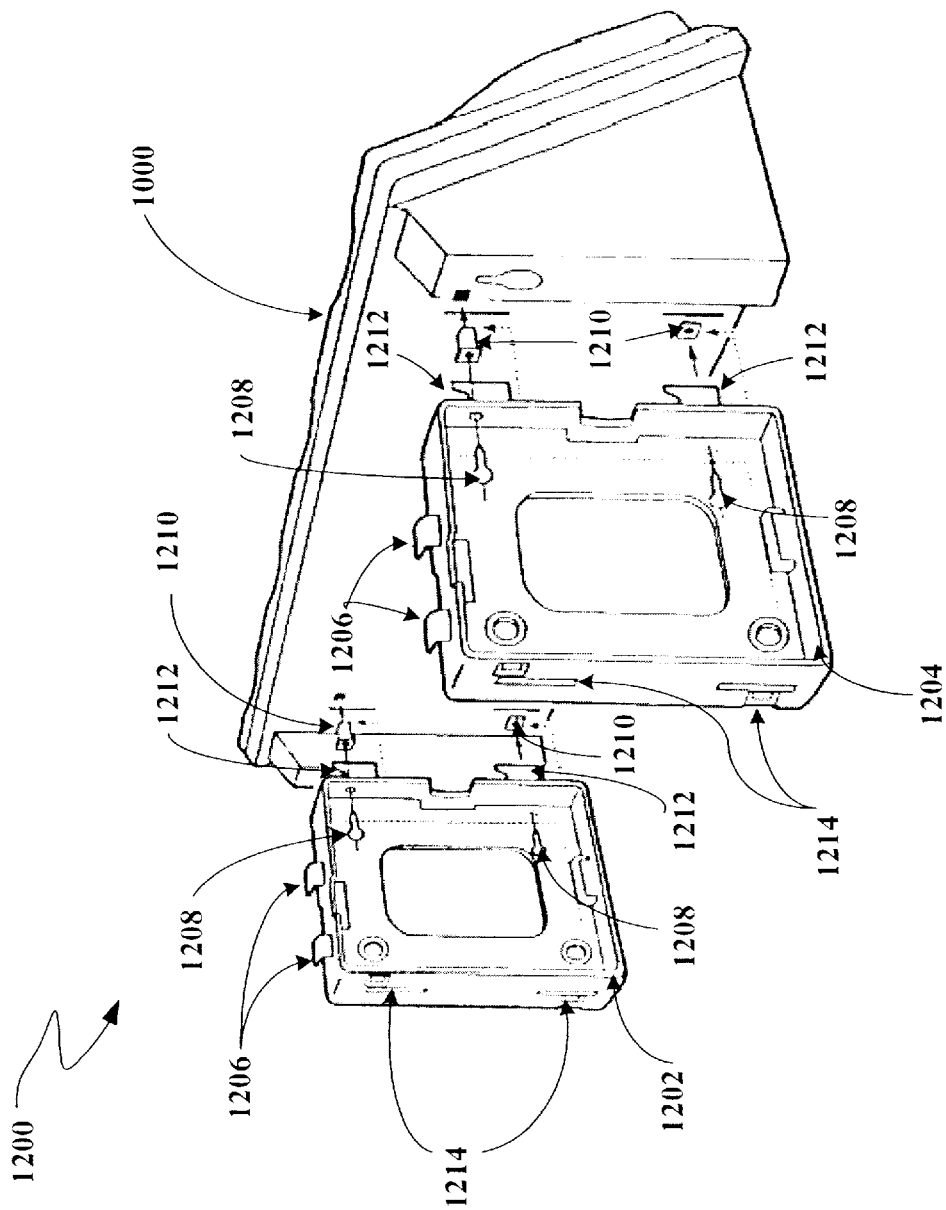
FIG. 17 is a rear view of the stackable cradle assembly of FIG. 15.

FIG. 17 shows the back side of the cradle 1000 of FIG. 15 with stacking elements 1202 and 1204 attached thereto. Each of the stacking elements 1202 and 1204 include horizontally facing attachment hooks 1212 and fastening means 1208 and 1210. The stacking elements 1202 and 1204 also include vertically facing attachment hooks 1206 for securing an additional cradle as shown in FIG. 18, and attachment slots 1214 for attaching additional stacking elements.

FIG. 18 shows a plurality of cradles 1310 and 1320 stacked on top of each other using stacking elements 1321 and 1322. Each of the stacking elements include horizontally (not shown) and vertically facing attachment hooks 1323 and slots (not shown) and fastening means 1324 and 1325 for interconnecting the upper cradle 1310 and the lower cradle 1320. In the two-cradle configuration 1300 of FIG. 18, for example, the two stacking elements 1321 and 1322 are attached to the backside of the lower cradle 1320 via the horizontally facing attachment hooks (not shown). The upper cradle 1310 is then mounted via the vertically facing attachment hooks 1323 disposed on the top side of the stacking elements 1321 and 1322, thus securing the lower and upper cradles 1310 and 1320.

FIG. 19 illustrates another multi-cradle configuration 1400 in accordance with the stackable cradle embodiment of FIG. 15. The multi-cradle configuration 1400 includes a lower cradle 1430, a middle cradle 1420 and an upper cradle 1410. With such a configuration, a two sets of stacking elements 1421, 1422 and 1431, 1432, 1433, 1434 are connected to the cradles 1410, 1420 and 1430 via the corresponding attachment hooks, slots and fastening means. Similarly, FIG. 20 shows another multi-cradle configuration comprised of eight stacked cradles 1510, 1520, 1530, 1540, 1550, 1560, 1570 and 1580. Thus, as shown by FIGS. 19 and 20, the stacking elements of the present invention are constructed and arranged such that in a stacking arrangement of n cradles, wherein the first cradle is the lowest cradle (cradle 1) and the topmost cradle is the n-th cradle (cradle n), each cradle i for cradles i to n requires n-i sets of stacking elements attached to the backside of thereof, and each cradle i for i=1 to n requires i-1 sets of stacking elements attached thereunder.

Figure 21:
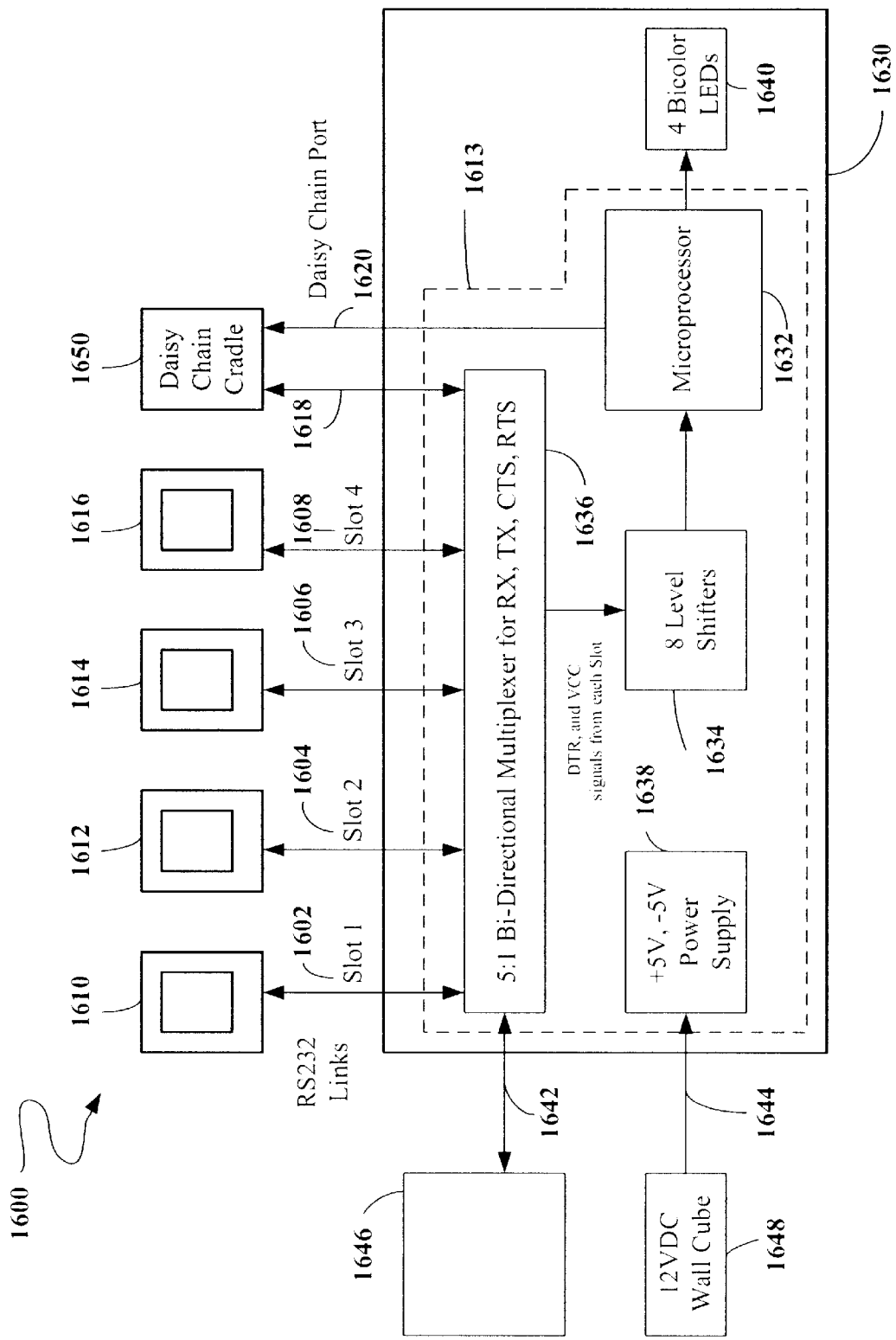
FIG. 21 is a circuit schematic for a 4-slot serial cradle according to a preferred embodiment of FIG. 15.

FIG. 21 shows a circuit schematic for a 4-slot serial cradle 1630 according to the preferred embodiment of the cradle shown in FIG. 15. Again, the number of slots or docking stations denoted by reference numerals 1602, 1604, 1606 and 1608 is shown by way of example and not limitation. The serial cradle 1630 includes a printed circuit board housing a data transfer circuit 1631. The data transfer circuit 1631 includes a microprocessor 1632 for managing communications between the a plurality of portable terminals 1612, 1614, 1616, 1618 and a host computer 1646 and other interconnected cradles 1650, a multiplexer 1636 for serial communications between each of the portable terminals 1612, 1614, 1616, 1618 and the host computer 1646, and a corresponding shift register 1634 coupled to multiplexer 1636 the for sending status signals from each of the portable terminals 1612, 1614, 1616, 1618 to the microprocessor 1632. The data transfer circuit 1631 is power by a DC power supply 1648 and includes provides the appropriate electrical signals to visual indicators 1640 mounted on the cradle 1630 for displaying the operational status for each of the portable terminals connected to the cradle 1630.

According to a preferred embodiment of the present invention, each docking station of the serial cradle 1630 includes a corresponding cradle data interface (not shown in FIG. 21) for providing serial data communications between the portable terminals. Preferably, as shown in FIG. 21, the cradle data interface are RS-232 ports for providing serial communication. The multiplexer 1636 is thus capable of processing RS-232 control signals, such as Request to Send (CA) and Clear to Send (CB) signals, and routing transmitted data signals to and from the appropriate portable terminals, ie., Transmit Data (BA) and Receive Data (BB).

The serial cradle 1630 further includes a daisy chain port 1620, e.g., another RS-232 port, for serially connecting one or more additional cradles. When the daisy chain port 1620 is used, the serial cradle firmware recognizes the daisy chain port 1620 as a fifth slot and uses the normal procedures to arbitrate and issue clearance for communications with the host computer 1646. Further, via the daisy chain port 1620, the serial cradle 1630 is capable of being a slave cradle to an Ethernet cradle and thus is capable of providing Ethernet connectivity in a round robin fashion to portable terminals inserted into the docking stations of the serial cradle.

As best shown by FIGS. 15 and 21, each serial cradle 1630 is provided with a plurality of visual indicators 1640 for displaying the operational status of each of the portable terminals connected to the serial cradle. For the 4-slot serial cradle corresponding to FIG. 21, for example, there are four LEDs 1 through 4 corresponding to each terminal slots or docking stations 1602, 1604, 1606 and 1608. In a preferred embodiment of the present invention, each of the LED's has four associated color states: OFF, RED, ORANGE and GREEN. When an LED is OFF, no portable terminal is presently connected to the corresponding slot. RED indicates the presence of a portable terminal, but with no established communication session. ORANGE at a 2 Hertz blink cycle, for example, indicates that a communication session has been established and is in progress. GREEN indicates the presence of portable terminal with a completed communication session.

Figure 22:
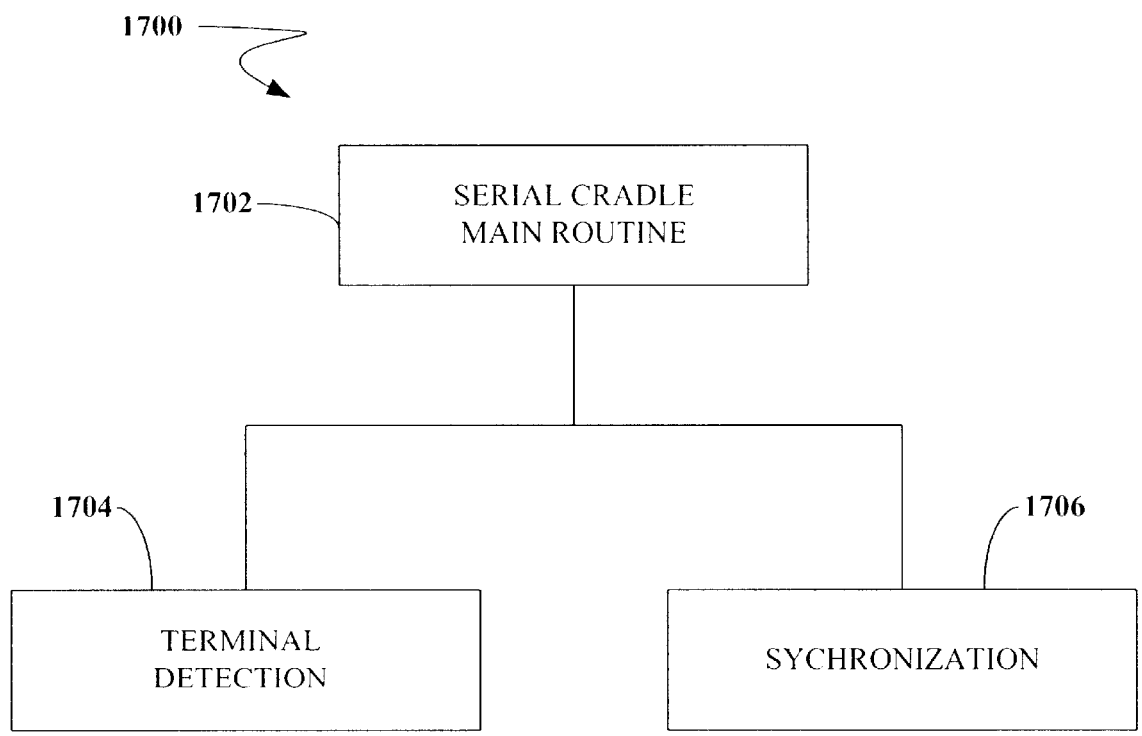
FIG. 22 shows the firmware architecture for the serial cradle of FIG. 21.

FIG. 22 shows the firmware architecture for the serial cradle of FIG. 21. The firmware 1700, which is executed by the microprocessor 1632, includes a main module 1702, a terminal detection module 1704 and a synchronization module 1706.

The terminal detection module 1704 of FIG. 22 is used to determine whether portable terminals are connected to one or more terminal slots of the serial cradle. When a portable terminal is connected, a voltage VCC is sensed from the portable terminal and detected by the module 1704 and associated hardware. The appropriate logic level is then forwarded to the microprocessor 1632.

The synchronization module 1710 provides means for automatically synchronizing data between the portable terminals and the host computer. Automatic terminal synchronization is performed to synchronize various entries in the portable terminal, such as for example datebook, address book, "to do" lists, memo pad and expense entries, with entries in the host computer. Synchronization is use to manage individual or multiple portable terminals with the host computer, and to automatically backup data from the portable terminal each time synchronize operations are performed. Terminal synchronization can be performed either locally by physically connecting the portable terminal to the corresponding terminal slot, or remotely by via a modem.

Changes to data made on the portable terminals or the host computer thus appear at all locations after the synchronization operations are performed. Synchronization is managed by a synchronization manager, which runs in the background and monitors a communications port of the host computer for a synchronization command from a portable terminal. The synchronization command can be provided by physically connecting the portable terminal to the corresponding terminal slot, or by user command. Synchronization commands are processed by the host computer on a first in, first out (FIFO) basis.

Figure 23:
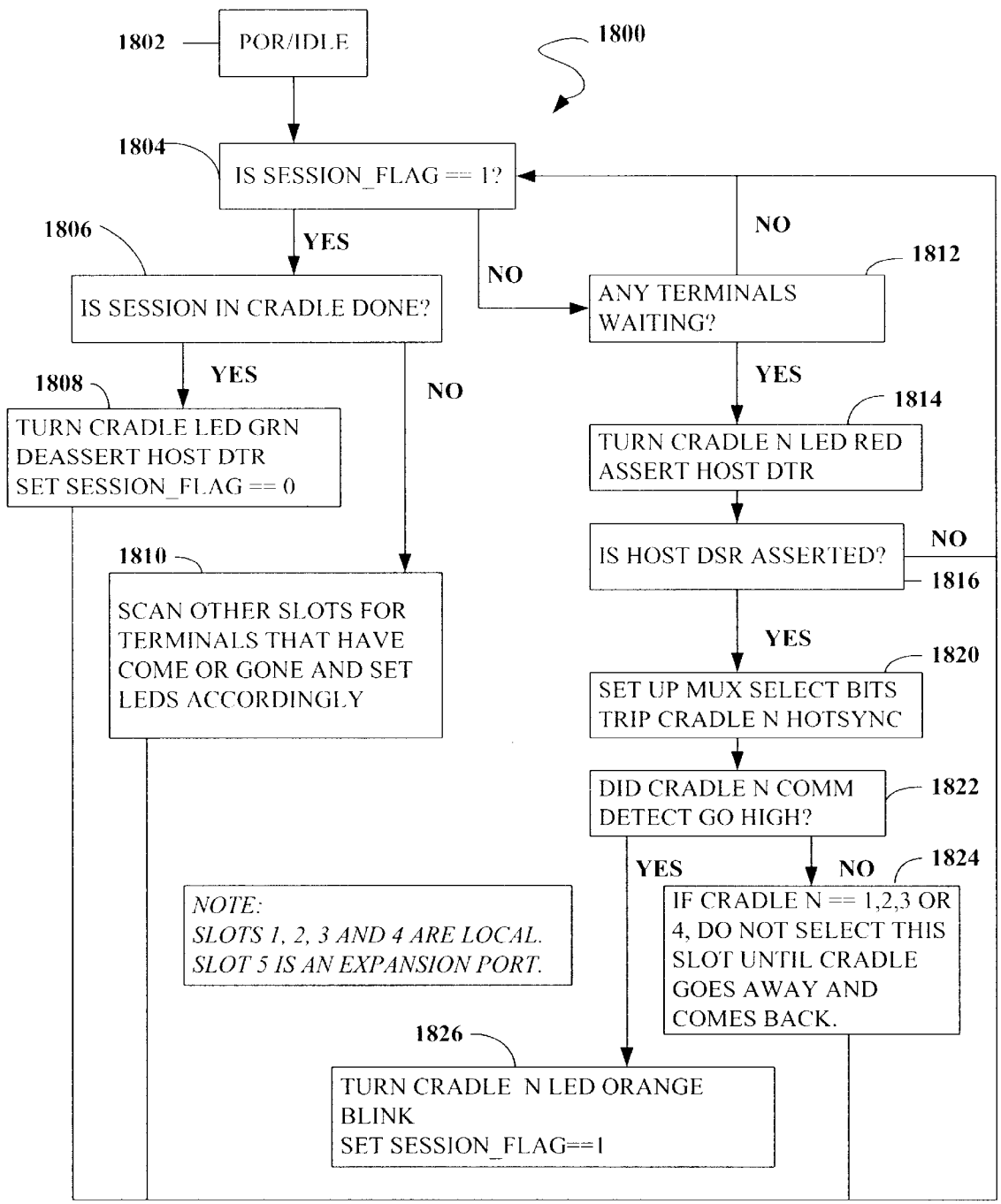
FIG. 23 is a flow diagram corresponding to the firmware of FIG. 22.

FIG. 23 is a flow diagram for the serial cradle main module 1702. First, a check of the docking stations is performed to determine whether any of the portable terminals are connected there to (Step 1802). When a terminal is detected at a docking station, a check is performed to determine whether a communication session is in progress (Step 184). If the session is done, the indicator light is set accordingly and a scan is done of the remaining cradles (Steps 1808 and 1810).

When the cradle firmware detects that a portable terminal has been inserted and that a communication session has been established, the firmware checks to determine whether any other terminals are waiting and if not the microprocessor launches a synchronization operation on that unit and sets the indicator lights appropriately (Steps 1812 through 1820). The status of a synchronization status line determines whether the synchronization is to be performed in a local mode or a remote or "modem" mode. A voltage greater the 0.7 volts on the synchronization status line causes the portable terminal to initiate a remote synchronization. If the synchronization status line is left floating or tied to ground, the portable terminal will initiate a local synchronization. When the serial cradle is daisy chained to an Ethernet cradle, the Ethernet cradle drives the synchronization status line of all slots and forces synchronization in a remote configuration.

If another portable terminal is inserted into a different slot while a communication session is in progress, the serial cradle will not allow a presently running communication session with a portable terminal to be interrupted. Instead, the serial cradle firmware remembers to establish a communication session with the newly connected portable terminal and executes synchronization thereof after completion of the currently running session.

Otherwise, each of the terminal slots of the serial cradle are serviced in a round robin fashion. An error in synchronization of one portable terminal will not affect synchronization of other portable terminals. In addition, there is appropriate debounce time between insertion of a portable terminal and the start of synchronization. Additional processing is provided if an error is detected (Steps 1822 through 1826).

Figure 24:
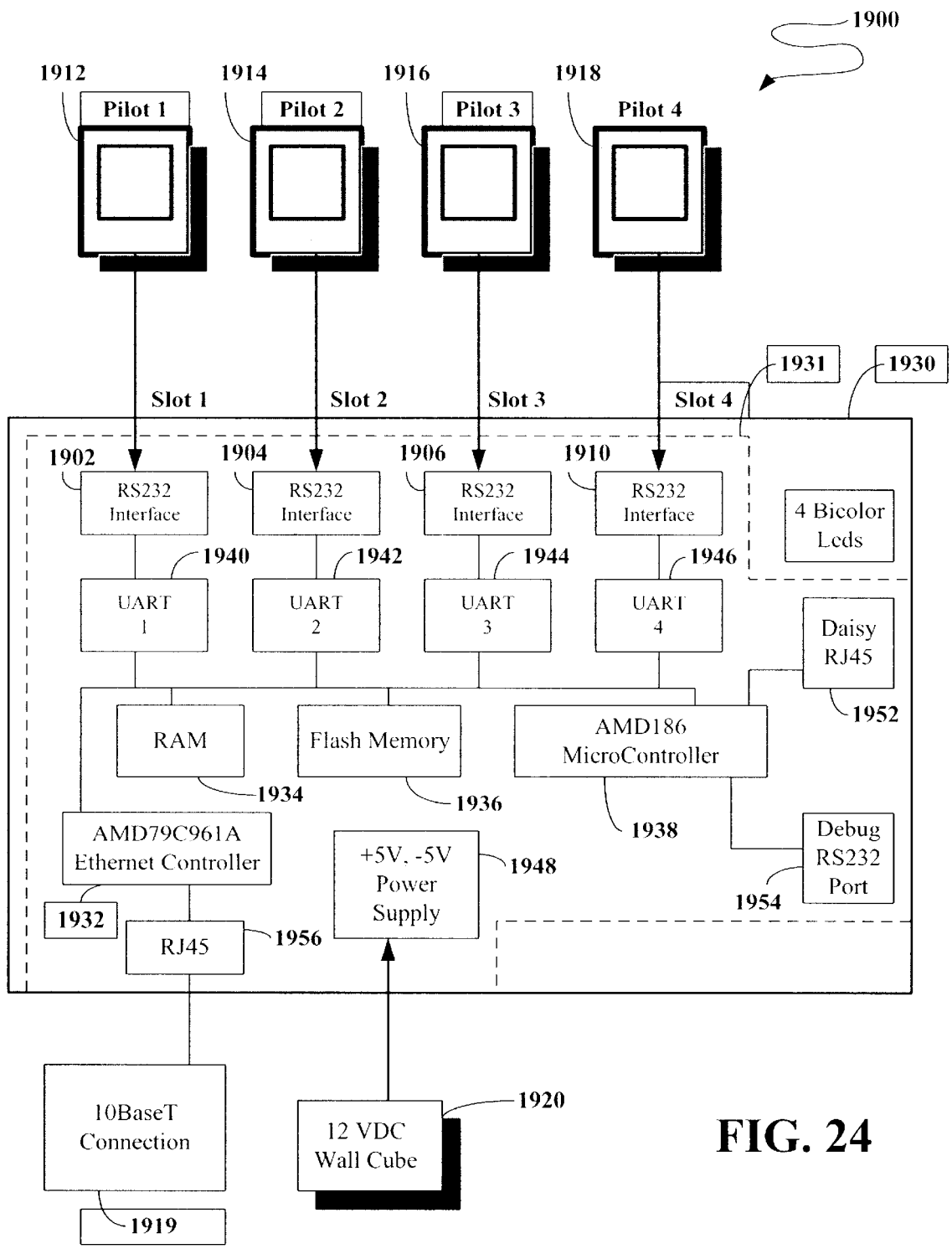
FIG. 24 is a circuit schematic for an Ethernet cradle according to a preferred embodiment of FIG. 15.

FIG. 24 shows a circuit schematic for a 4-slot Ethernet-based cradle 1930 according to a preferred embodiment of the present invention. As with the 4-slot serial cradle of FIG. 21, the number of slots shown is not intended to limit the invention in any way. The Ethernet cradle 1630, which can be adapted for a variety of Ethernet media types including 10BASE-T, 10BASE-F, and 100BASE-T, etc., includes a printed circuit board housing a data transfer circuit 1631, which includes: an Ethernet controller 1932, such as an AMD79C961A, for buffering data and processing data packets; a RAM memory device 1934 for temporarily storing packetized data; a programmable memory device 1936, such as FLASH or EEPROM memory, for storing executable code; a micro-controller 1938, such as an AMD186, for executing the stored executable code; a plurality of serial data communications devices 1940, 1942, 1944 and 1946 (UARTS) corresponding to a plurality of portable terminals 1912, 1914, 1916, 1918 for converting the parallel data provided by the micro-controller 1938 into serial data for transmission to the portable terminals 1912, 1914, 1916, 1918; a plurality serial data interfaces 1902, 1904, 1906 and 1908 for providing a serial data link between the each of the portable terminals 1912, 1914, 1916, 1918 and the corresponding serial data communications devices. Each Ethernet board also has the appropriate connector interfaces for 10BASET connection 1919, DC power 1920, debug 1954 and daisy chain connections 1952.

Mounted on the front face of the Ethernet cradle 1930 are a plurality of visual indicators for displaying the operational status of the portable terminals connected to the Ethernet cradle 1930. For the 4-slot Ethernet cradle corresponding to FIG. 24, for example, there are four LEDs 1 through 4 corresponding to each of the docking stations. In a preferred embodiment of the present invention, each of the LED's has six associated color states: OFF, Solid RED, Slow Flash RED, Fast Flash RED, Slow Flash GREEN and GREEN. When an LED is OFF, no portable terminal is presently connected to the corresponding slot. A solid RED indicates the presence of a portable terminal, but with no established communication session. The flashing RED states both indicate error conditions with the communications link to the portable terminal: a slow flash RED indicates that communication to the portable terminal did not start, and a fast flash RED indicates that communication did not end. A slow flash GREEN at a 2 Hertz blink cycle, for example, indicates that a communication session has been established and is in progress with a connected portable terminal. A solid GREEN indicates the presence of a portable terminal with a completed communication session.

Figure 25:
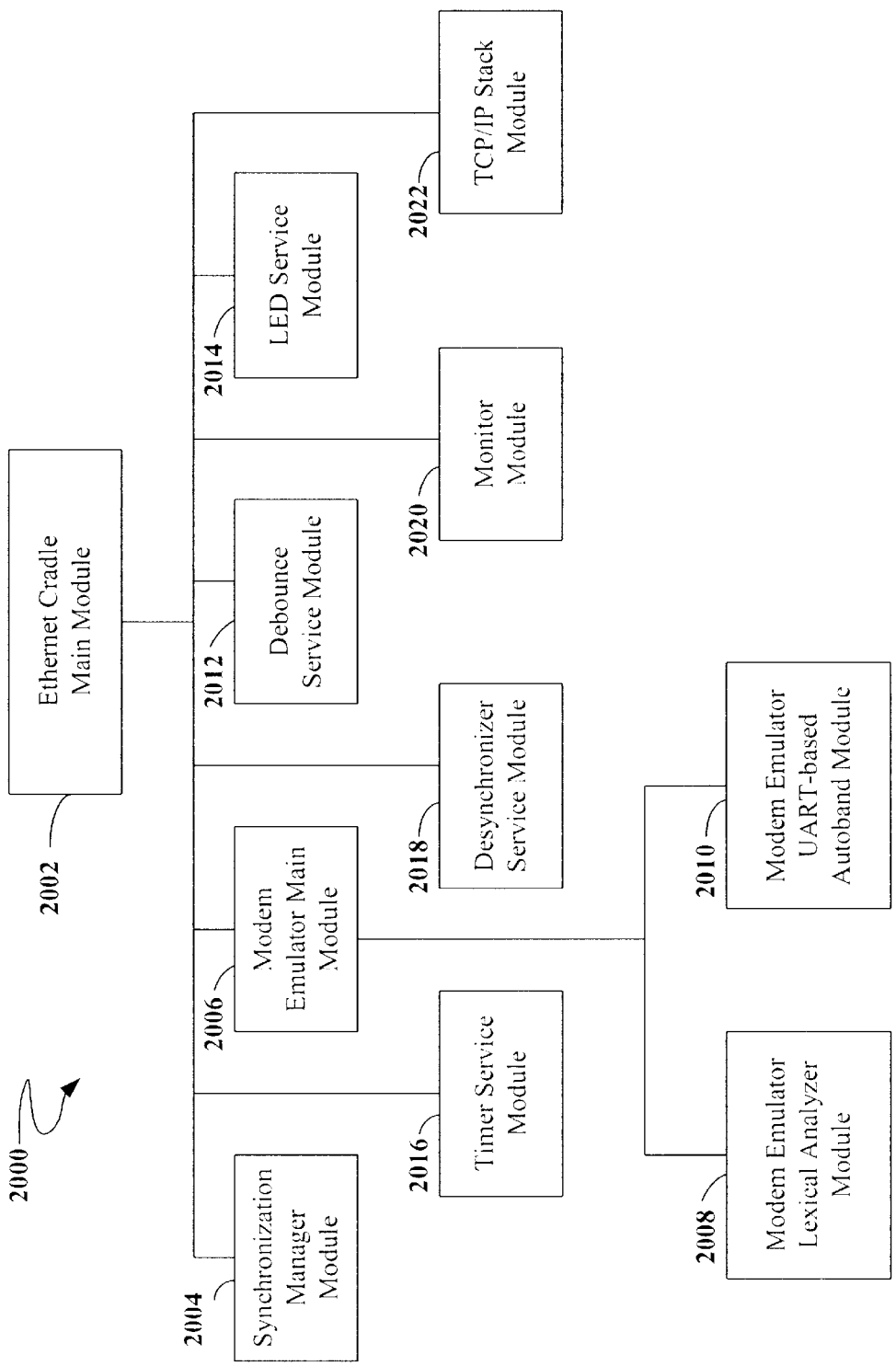
FIG. 25 shows the firmware architecture for the Ethernet cradle of FIG. 24.

FIG. 25 shows the firmware architecture for the Ethernet-based cradle of FIG. 24. The software includes: an Ether cradle main (ECR) module 2002; a synchronization manager module 2004; modem emulator modules 2008 through 2010; a debound service (DEB) module 2012; an LED service (LED) module 2014; a timer service (TMR) module 2016; a desynchronizer service (DSY) module 2018; a monitor (E86) module 2020; and a TCP/IP stack (EBSNET) module 2022. The software modules shown in FIG. 25 are stored in the FLASH or EEPROM memory 1936 and executed by the micro-controller 1938 of FIG. 24.

The firmware of FIG. 25 allows the Ethernet cradle to act as a router/bridge between Internet Protocol (IP) packets from the Ethernet micro controller and the various serial data interfaces. To supply network IP address assignment, the Ethernet cradle provides IP NAT translation between the IP address of each serial data interface and the IP address assigned to the corresponding portable terminal. This strategy allows the cradle to use the host computer to assign addresses to each serial data interface. When a portable terminal are is connected to a serial data interface, the terminal's IP address is used only for the PPP link between the terminal and the Ethernet cradle. The IP address assigned by the host computer is used for all network communication.

In addition, the Ethernet cradle firmware allows the cradle to "fake out" a portable terminal into believing that it is attached to a modem in a dial-up network. Upon detecting a new portable terminal being inserted into a slot, the Ethernet cradle automatically initiates a "modem: synchronization operation. The portable terminal then attempts to dial a host. The Ethernet cradle thus emulates a modem, responding to the AT dialing commands as required. Since no real phone system is involved, the "dialing" and "connection" phases are instantaneous. After a PPP session is established, the Ethernet cradle "bridges" the link between itself and the portable terminal by moving the data to Ethernet queues for transmission across the network. As part of the bridging, the cradle translates the IP address from that used on the PPP link to the host computer assigned link for the slot.

In accordance with a preferred embodiment of the present invention, the ECR routine 2002 is responsible for initializing the cradle hardware, and creating and activating all subordinate hardware and software components and starting the main event processing. The ECR routine 2002 further collects IP addresses from the host server, maintains PPP links and outputs debug information to the expansion port. If requested, the ECR routine 2002 can also process packet data for the synchronization manager module 2004.

Referring again to FIG. 25, the synchronization manager module 2004 is used for initializing synchronization operations for portable terminals connected to the Ethernet cradle. The synchronization operations are described above in more detail with reference to the serial cradle embodiment of FIG. 21. Module 2004 is responsible for all functions relating to starting, stopping, and tracking synchronization operations related to the portable terminals inserted in the local or expansion cradle slots. These functions include controlling the status LEDs, implementing watchdog timeouts on the starting and finishing of the synchronization operations, and restarting the synchronization routine on all slots and the expansion port if requested.

Modem emulation modules include a modem emulator lexical analyzer (MO_LEX) module 2008 and a modem emulator UART-based auto-baud (MO-MUA) module 2010. The modem emulation modules allow the portable terminals to establish PPP connections through a modem with a remote Internet Service Provider (ISP). Thus, the cradle takes the place of the ISP, forwarding IP packets received on the PPP connection to the Ethernet and via the Ethernet to the Internet, and vice versa. With such a link, the portable terminals then establish a TCP/IP connection with the host computer, and synchronization operations are performed over the link.

In a preferred embodiment of the present invention, the MO_MOE module 2006 emulates a Hayes compatible modem long enough to recognize the baud rate of the portable terminals and to provide a CONNECT <BAUD> message to the portable terminal so that a PPP session can begin. The MO_LEX module 2008 tokenizes the stream of modem setup and dial commands sent through the serial data interfaces by the portable terminals. The MO-MUA module 2010 automatically detects that baud rate at which the portable terminals are communicating.

The DEB module 2012 provides generic debounce service: for each debounce entry registered, this module will accept jittery UP and DOWN events and give callback with debounced UP and DOWN events to the registered owner of the debounce entry.

The LED module 2014 provides a generic 4-color (counting OFF) LED service. This service handles all LED logic including setting the color or turning the LEDs OFF, and allows setting 3 possible duty cycles, e.g., solid color, fast flash, and slow flash.

The TMR module 2016 is a generic timer service that provides users with either one-shot or periodic timers. When the timer times out, a callback is generated to the timer owner. This module service also multiplexes single timers into several timers wherein the resolution of the multiplexed timers is approximately 0.5 msec.

The DSY module 2018 is a generic event queue. However, it has been specialized to register an event dispatch task with the EBSNET stack. So, all events posted to it will eventually result in a dispatch via a callback to the component that posted the event. These messages are dispatched at application idle time.

The E86 module 2020 is a monitor that accepts downloads of new firmware for the cradle, including if necessary, upgrading the E86 module itself The module monitors the expansion port of the cradle and is accessible for about three seconds after power-up. This module can also be used to configure the Ethernet cradle to run in diagnostic mode. In diagnostic mode, operation of the cradle proceeds normally, except that the expansion port is utilized to give diagnostic messages to a host PC, rather than as a data link to the serial chain.

The EBSNET module 2022 implements Ethernet and serial TCP/IP communication. The module also recognizes events from the UART and the modem emulator module.

Figure 26:
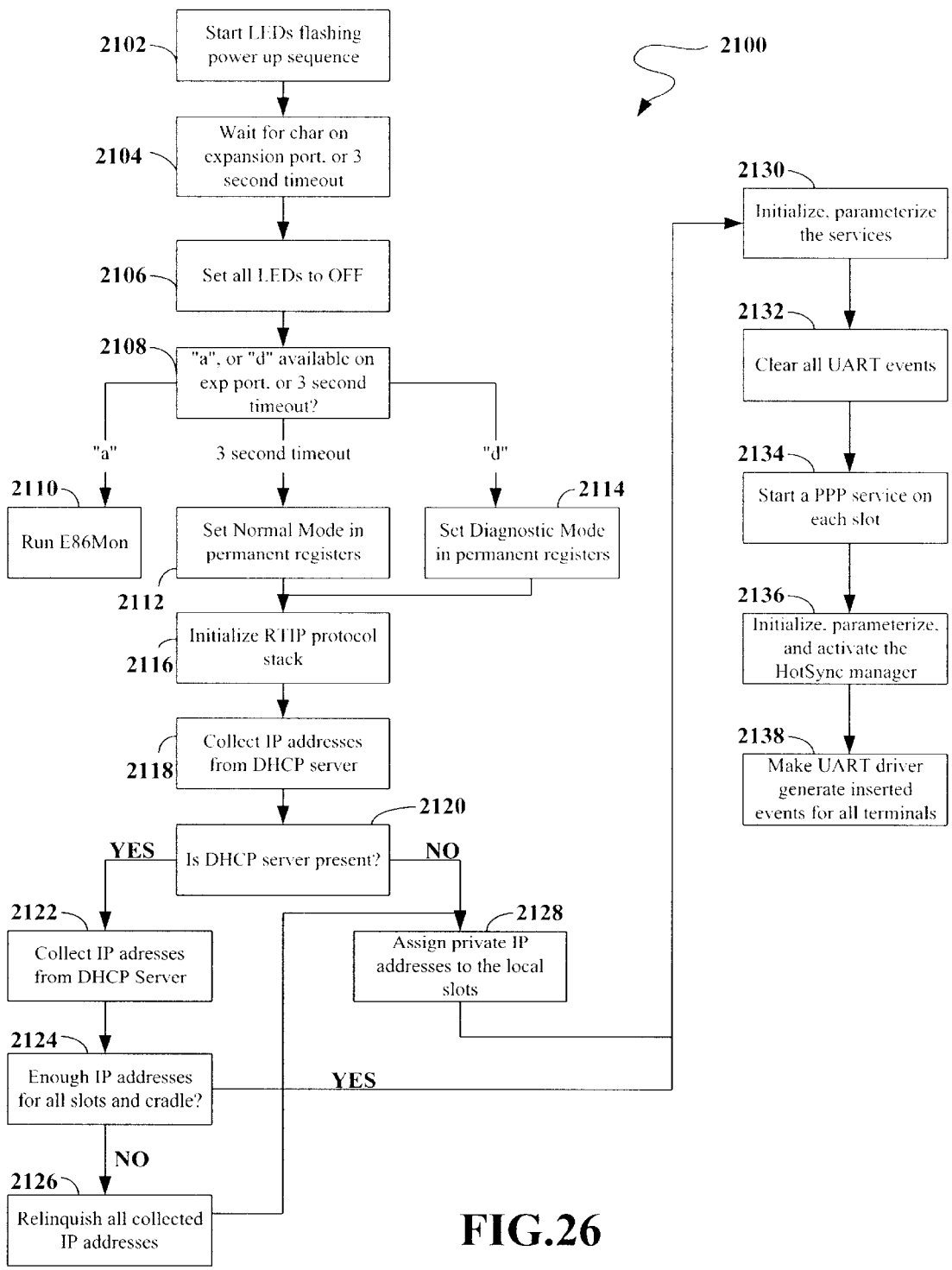
FIG. 26 is a flow diagram corresponding to the firmware of FIG. 25.

FIG. 26 is a flow diagram for the Ethernet cradle main module 2002. As shown in FIG. 26, the ECR module 2002 issues instructions to start the cradle LEDs flashing a power-up sequence (Step 2102). The ECR module 2002 then waits for a character input at the expansion port, or performs a three second timeout if none is present (Step 2104). All cradle LEDs are then turned off. (Step 2106). If an "a" character is detected at the cradle expansion port, the E86 monitor module is executed (Step 2110). If a "d" character is detected, all permanent registers of the cradle are set to diagnostics mode (Step 2114). If the ECR module 2002 performs a three second timeout, then the permanent registers are set to normal mode (Step 2112).

In normal mode, the ECR module 2002 then initializes the RTIP protocol stack and attempts to collect IP addresses corresponding to the cradle slots from the host server (Steps 2116 and 2118). If a server is present in accordance with Step 2120, then all IP addresses registered with the server are collected (Step 2122). If no server is present, then private IP addresses are assigned to the local slots and to the logical slot that represents the serial chain (Step 2128). Note, Step 2128 is executed only for debugging purposes, and is not intended for general use in that the privately assigned addresses may conflict with other private IP addresses.

Referring again to Step 2122, if enough IP addresses are available for all slots of the cradle, then the ECR module initializes and parameterizes the service modules shown in FIG. 25 (Step 2130). All UART events are then cleared (Step 2132), and PPP services are started on each slot (Step 2134). The synchronization manager module is that initialized, parameterized and activated (Step 2136), and the UART driver generates events for all portable terminals (Step 2138). If according to Step 2124 there are not enough IP addresses, all collected IP addresses are relinquished and processing continues according to Step 2128.

Figure 27:
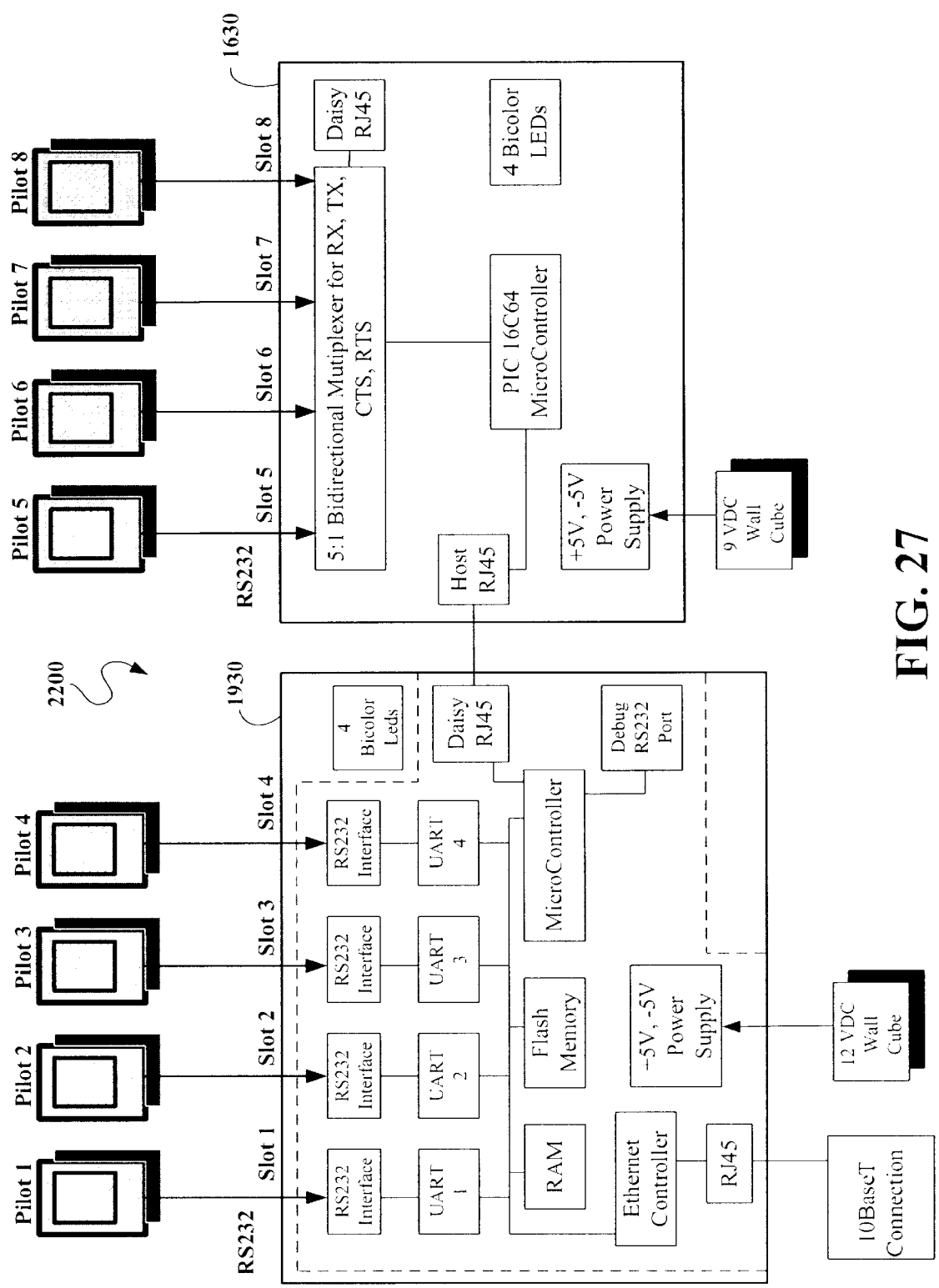
FIG. 27 is a circuit schematic for a daisy chained configuration utilizing the 4-slot serial cradle of FIG. 21 and the 4-slot Ethernet cradle of FIG. 24.

FIG. 27 shows another preferred embodiment of the present invention wherein the 4-slot serial cradle 1630 of FIG. 21 is daisy chained to the 4-slot Ethernet-based cradle 1930 of FIG. 24. With this configuration, simultaneous data communications is possible with five portable terminals at any given moment, i.e., the four Ethernet terminals and one of the serial terminals.

The aforedescribed embodiments of the present invention also feature a diagnostics utility in each of the portable terminals for ensuring that the portable terminals are operating properly and to assist in troubleshooting if necessary. The diagnostics utility tests the various features of the portable terminals, and reports to the user whether or not the terminal features are functioning properly.

Figure 28:
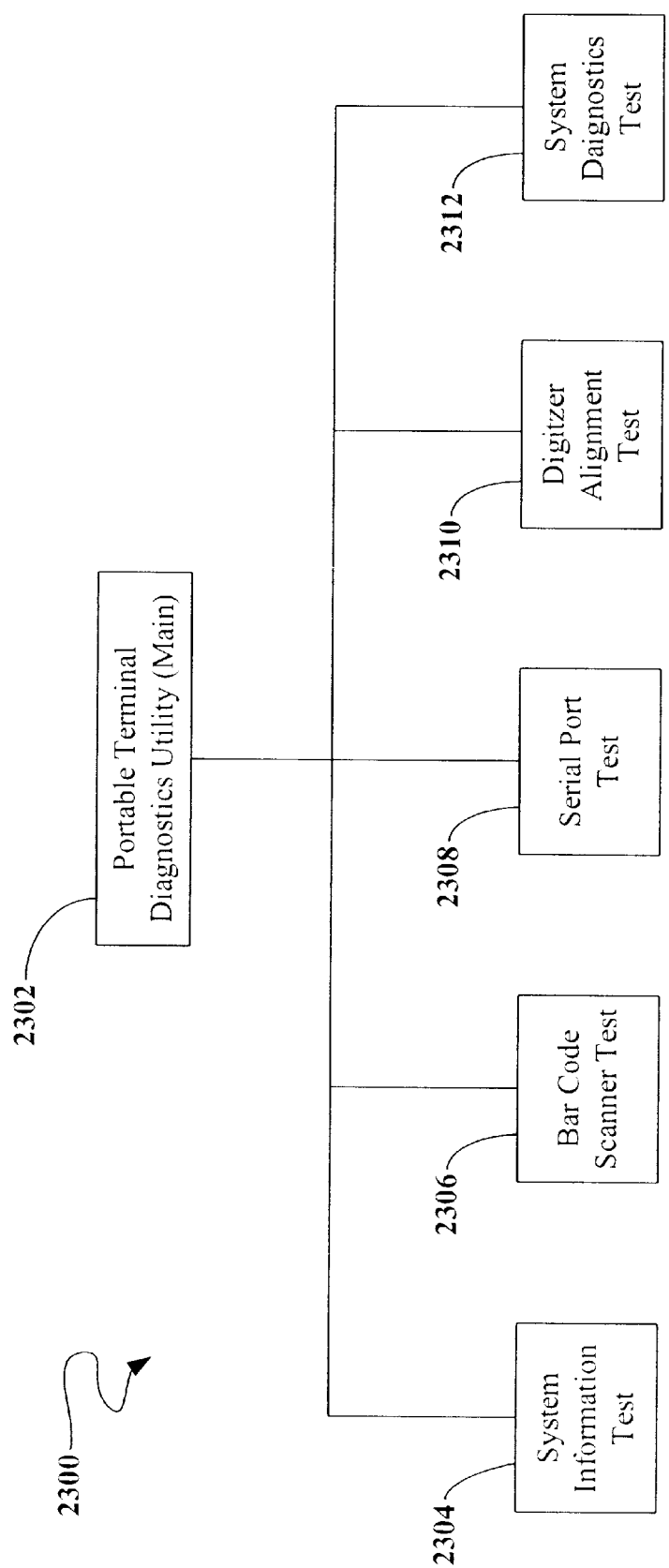
FIG. 28 shows the software architecture for a portable terminal diagnostics utility according to the present invention.

FIG. 28 shows the software architecture for the portable terminal diagnostics utility. The portable terminal diagnostics utility 2300 includes a main module 2302, a system information test module 2304, a bar code scanner test module 2306, a serial port test module 2308, a digitizer alignment test module 2310, and a system diagnostics test module 2312. Preferably, the diagnostics utility of FIG. 27 is implemented in software and stored in ROM in the each of the portable terminals. Corresponding graphical user interfaces, as shown in FIGS. 29–32 are also provided for executing the various tests. As shown, the diagnostics screens are written using the Satellite Forms™ software development tool.

Figure 29:
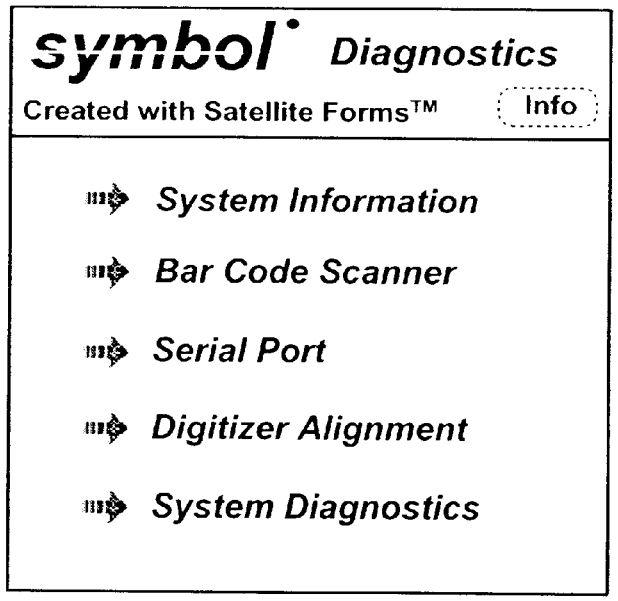
FIG. 29 shows an example of a main diagnostics screen corresponding to the diagnostics utility of FIG. 28.

FIG. 29 shows an example of a main diagnostics screen 2400 corresponding to the diagnostics utility of FIG. 28. When the diagnostics utility is run, the main diagnostics screen 2400 displays the above-referenced test module options to the user. Further selection of the displayed options generates the appropriate display of related information.

Figure 30:
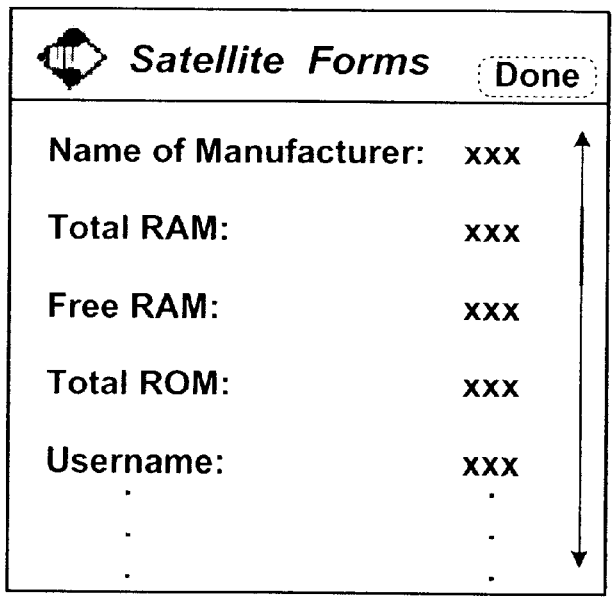
FIG. 30 shows an example of a screen corresponding to the system information test of FIG. 28.

FIG. 30 shows an example of a screen 2500 corresponding to the system information test 2304 of FIG. 28. The system information test is used to describe the attributes of the portable terminal, and is used along with the display screen 2500 to report information including but not limited to the following information about the portable terminals: name of manufacturer, the total amount of RAM, the amount of available or free RAM, the amount of ROM, the user name of the terminal, running version of the operating system and the voltage level or charge status of the batteries.

Figure 31:
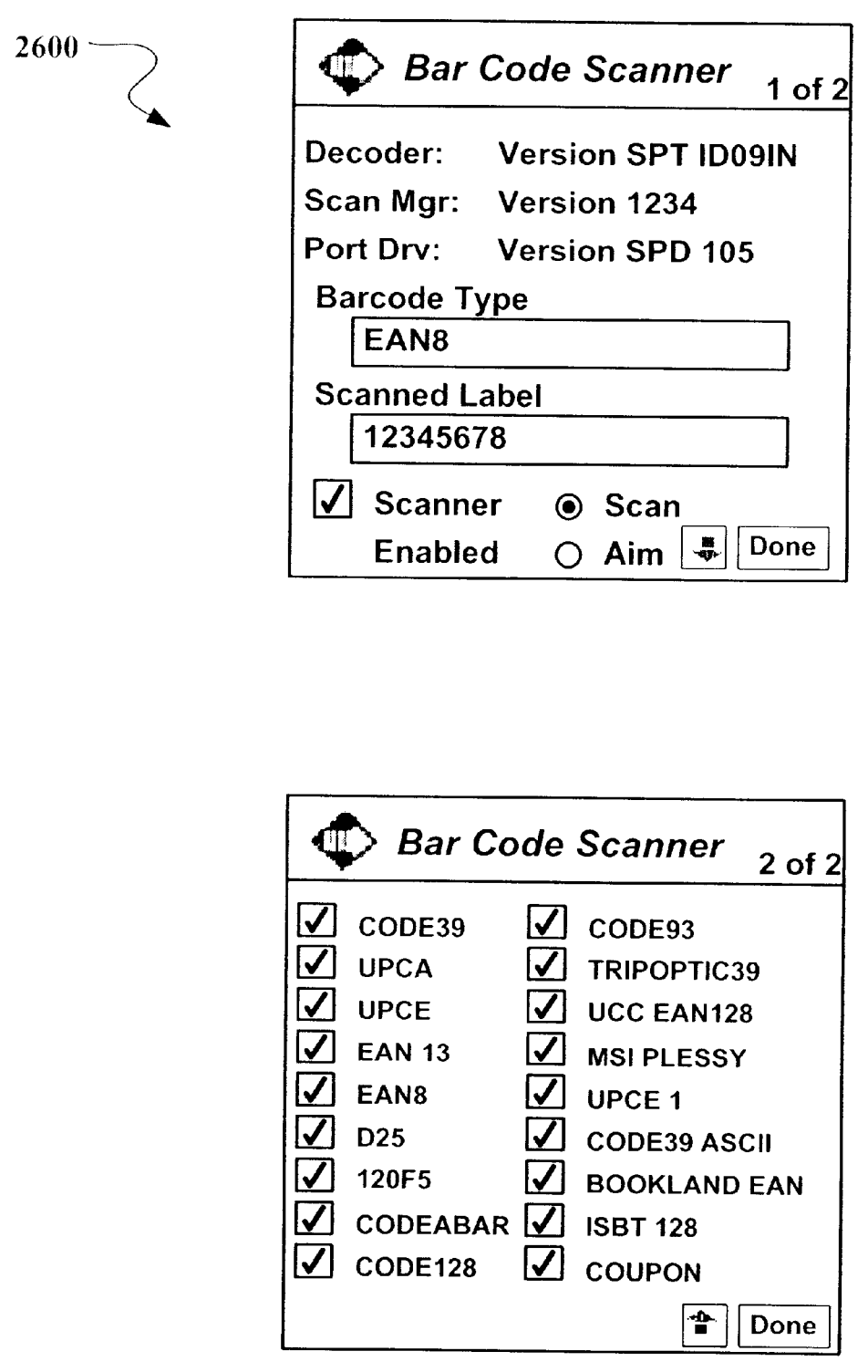

FIG. 31 shows an example of screens corresponding to the bar code scanner test 2306 of FIG. 28. The bar code scanner test verifies proper operation of the integrated scanner in the portable terminal, and the associated screens allow for the selection of bar code and label types.

Figure 32:
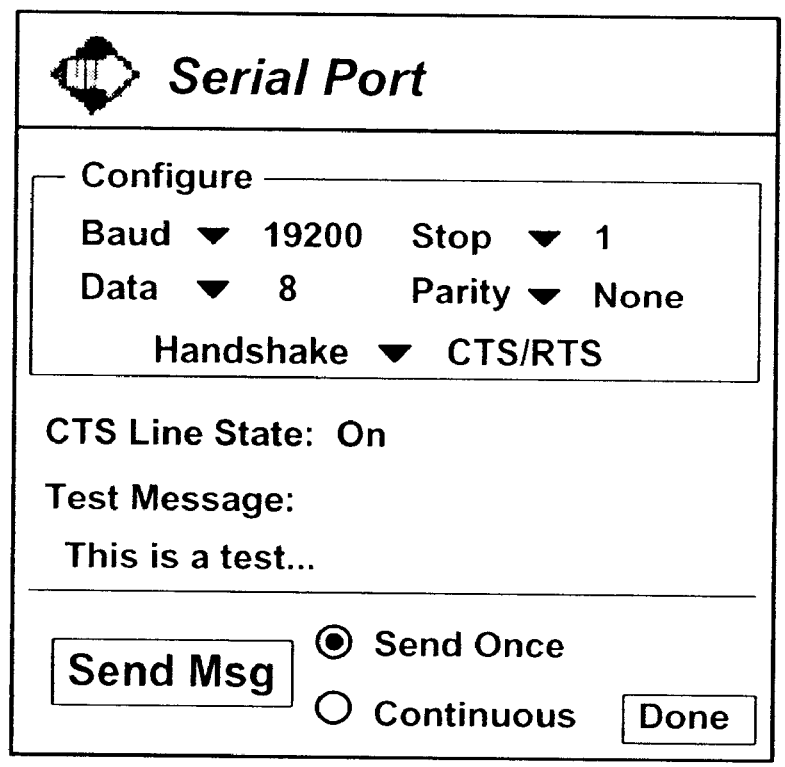
FIG. 32 shows an example of a screen corresponding to the serial port test of FIG. 28.

FIG. 32 shows an example of a screen 2700 corresponding to the serial port test module of FIG. 28. The serial port test is used to test the portable terminal's serial port by sending a test message. Test configuration and results are then displayed on screen 2700.

The digitizer alignment test is used to test the tracking of a stylus or comparable pointing device on the portable terminal display screen. To run this test, the pointing device is contacted in various places on the display screen and crosshairs appear under the pointing device. The crosshairs are then used to track the motion of the pointing device on the display screen.

The systems diagnostics test is an interactive test of all the terminal's system features. This test prompts the user to perform certain steps, which are verified via visual or audio indications and recorded in a systems diagnostic log.

Referring again to FIGS. 9A and 9B, a preferred embodiment of the present invention includes a bar code scanner such as conventional moving laser bar code scanner. Such a laser scanner includes a laser source and a motor device, which typically produces a large power surge if the laser source and motor device are simultaneously powered ON. Accordingly, the present invention also includes a method for minimizing power consumption of the power terminal by first powering the scanner motor and then the scanner laser source.

Figure 33:
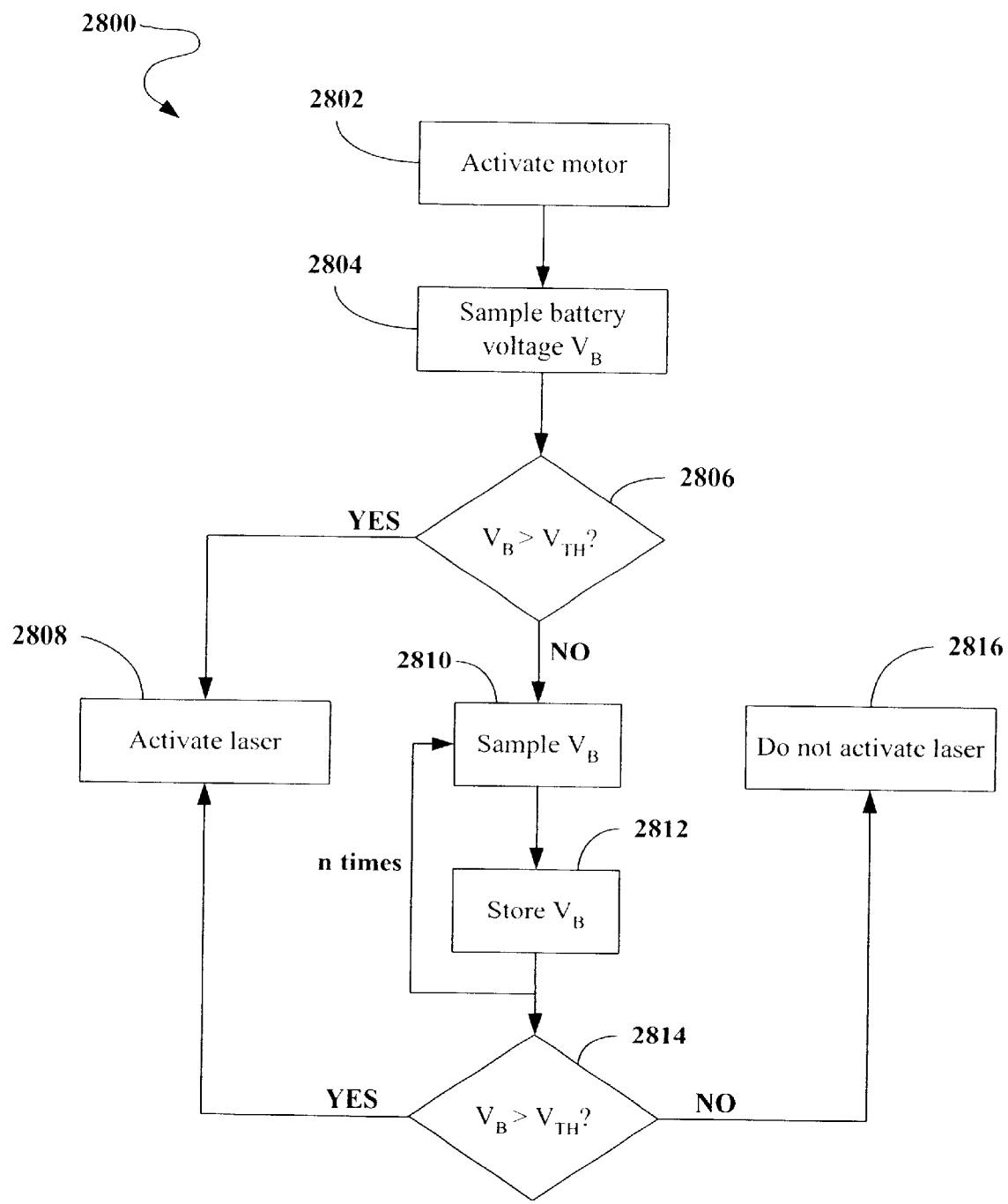
FIG. 33 shows a preferred method for powering on a bar scanner motor and corresponding laser source of a portable terminal.

FIG. 33 shows a preferred method for powering on a bar scanner motor and corresponding laser source of a portable terminal according to the present invention. The method includes the steps of: activating the bar scanner motor (Step 2802); sampling the battery voltage $V_B$ of the portable terminal (Step 2804); comparing the battery voltage $V_B$ to a threshold battery voltage $V_{TH}$ (Step 2806); and activating the laser source if the battery voltage exceeds the threshold battery voltage $V_{TH}$ (Step 2808). If the battery voltage $V_B$ equals or is less than the threshold battery voltage $V_{TH}$, the method further includes the steps of: sampling the battery voltage a plurality of times (Step 2810); storing readings corresponding to said plurality of sampling steps (Step 2812); determining whether a majority of the readings exceed the battery voltage threshold (Step 2814); and activating the laser source when a majority of the readings exceed the battery voltage threshold (Step 2816).

The above-described power management scheme may be critical in certain applications wherein data stored in the portable terminals would be difficult to reproduce. The above scheme thus ensures that the voltage is not drained to a point where the battery will no longer service the volatile memory addresses. Accordingly, prior to undertaking a procedure requiring relatively high battery usage, the battery voltage level can also be checked. The user is then notified of low battery power if the level is insufficient to complete the initialized action.

In addition, battery consumption is reduced by avoiding high current drain resulting from starting many components simultaneously. Then if a laser scanner such as the SE-900 is used, the motor for the mirror, LED and photodetector could be powered in a staggered manner, i.e., not simultaneously.

The terminal of the present invention further provides several other ergonomic advantages. For example, as shown in FIG. 10, keys 82 are provided at the top of the terminal in both the right and left sides of the terminal such that the terminal can be used by both left and right handed individuals. The keys 82 are also designed to activate by applying pressure to either the top or side of the keys. The translations are converted internally by guides and springs to active buttons notwithstanding the direction of the pressure applied.

In addition, the laser scanner is designed to release a visible light from the top of the terminal so that it is evident to the user what is being scanned by the terminal bar code reader. Upon use, the terminal rests comfortably in the hands of the consumer and both the screen and laser light coming out of the terminal should be clearly visible to the consumer upon undertaking a scanning action.

The laser scanner may also share a window with a IRDA port on the terminal thereby reducing component requirements. The combination of a housing including a touch sensitizing screen, a dedicated writing area with hand recognition and software buttons, hard buttons, and left/right bar code reading triggers with laser output away from and in the line of sight of the user extending forward from the hand holding. The terminal provides an improved economic and functional design which is intuitive in usage and feasible for extended usage in commercial environments.

The herein described embodiments of the present invention are intended to provide the preferred embodiments of the present invention as currently contemplated by the applicants. It would be obvious to any one of skill in the relevant art based on the herein described examples without straying from the present invention that numerous modifications could be made to the described preferred embodiments. Accordingly, the herein described embodiments are merely exemplary in nature and are not intended to represent every possible embodiment of the present invention.

What is claimed is:

1. A personal shopping system for combined use in both a home of a user and at least one shopping establishment, said system comprising:
    a host computer;
    a host modem coupled to said host computer, at least one shopping establishment kiosk cradle coupled to said host computer, said at least one shopping establishment kiosk cradle in turn comprising:
        a kiosk portable terminal-receiving station; and
        a kiosk data interface associated with said kiosk portable terminal-receiving station;
    a home cradle associated with the home of the user, said home cradle in turn comprising:
        a home portable terminal-receiving station;
        a home data interface associated with said home portable terminal-receiving station; and
        a home data transfer circuit, said home data transfer circuit being coupled to said home data interface for data exchange therewith, said home data transfer circuit being configured for data exchange with said host modem; and
    a portable terminal, said portable terminal in turn comprising:
        a memory for storing data associated with bar codes which are in turn associated with items related to shopping; and
        a two-way terminal data interface coupled to said memory, said terminal data interface being configured for data exchange with said kiosk data interface when said portable terminal is received in said kiosk portable terminal-receiving station, said terminal data interface being configured for data exchange with said home data interface when said portable terminal is received in said home portable terminal-receiving station, said terminal data interface being configured for reading the bar codes associated with the items related to shopping;
    wherein:
        said home data transfer circuit supplies said host computer with the data associated with the bar codes when said portable terminal is received in said home portable terminal-receiving station;
        said shopping establishment kiosk cradle accepts the data associated with the bar codes from said portable terminal through said kiosk data interface and said terminal data interface when said portable terminal is received in said kiosk portable terminal-receiving station, and then downloads the data associated with the bar codes to said host computer; and
        said host computer receives the data associated with the bar codes and stores the data in a shopping list database.

2. The personal shopping system of claim 1, further comprising at least one point-of-sale checkout terminal associated with the shopping establishment and coupled to said host computer.

3. The personal shopping system of claim 1, wherein said portable terminal further comprises intrinsic identifying indicia to identify the user to said host computer.

4. The personal shopping system of claim 1, wherein said home data transfer circuit comprises an interface card for coupling said home cradle to a separate home personal computer and home modem, which in turn communicate with said host modem.

5. The personal shopping system of claim 1, wherein said home data transfer circuit comprises a home modem which communicates with said host modem.

6. The personal shopping system of claim 1, wherein said portable terminal further comprises:
    a display for displaying information to the user; and
    a plurality of control keys for permitting the user to interact with the display.

7. The personal shopping system of claim 1, wherein:
    said kiosk data interface is a kiosk data interface;
    said home data interface is a home data interface;
    said two-way terminal data interface is a two-way terminal data interface; and
    said portable terminal further comprises an elongate pen-shaping housing having an end with an optically transparent passage therethrough, said memory and said two-way terminal data interface being arranged in said housing with said two-way terminal data interface positioned for data communication through said transparent passage.

8. The personal shopping system of claim 1, further comprising at least one wireless multi-access point associated with the shopping establishment and coupled to said host computer, wherein said portable terminal further comprises:
    a wireless transceiver coupled to said memory and configured for wireless communication with said at least one wireless multi-access point; and
    a position-sensing module which senses position of the user within the shopping establishment and which enables communication with the user when the user has deviated from an optimal shopping path in the shopping establishment.

9. A personal shopping system home station adapted for use with a personal shopping system which is in turn adapted for use in both a home of a user and at least one shopping establishment, the personal shopping system including a host computer coupled to a host modem, the personal shopping system also including a shopping establishment kiosk cradle having a kiosk portable terminal-receiving station and a kiosk data interface, said home station comprising:
    a home cradle associated with the home of the user and adapted to remain therein, said home cradle in turn comprising:
        a home portable terminal-receiving station;
        a home data interface associated with said home portable terminal-receiving station; and
        a home data transfer circuit, said home data transfer circuit being coupled to said home data interface for data exchange therewith, said home data transfer circuit being configured for data exchange with the host modem; and
    a portable terminal which is portable between the home of the user and the at least one shopping establishment, said portable terminal in turn comprising:
        a memory for storing data associated with bar codes which are in turn associated with items related to shopping; and
        a two-way terminal data interface coupled to said memory, said terminal data interface being configured for data exchange with said kiosk data interface when said portable terminal is received in said kiosk portable terminal-receiving station, said terminal data interface being configured for data exchange with said home data interface when said portable terminal is received in said home portable terminal-receiving station, said terminal data interface being configured for reading the bar codes associated with the items related to shopping;

wherein:
   said home data transfer circuit supplies the host computer with the data associated with the bar codes when said portable terminal is received in said home portable terminal-receiving station;
   the shopping establishment kiosk cradle accepts the data associated with the bar codes from said portable terminal through the kiosk data interface and said terminal data interface when said portable terminal is received in the kiosk portable terminal-receiving station, and then downloads the data associated with the bar codes to the host computer; and
   the host computer receives the data associated with the bar codes and stores the data in a shopping list database.

10. The personal shopping system home station of claim 9, wherein said portable terminal further comprises intrinsic identifying indicia to identify the user to the host computer.

11. The personal shopping system home station of claim 9, wherein said home data transfer circuit comprises an interface card for coupling said home cradle to a separate home personal computer and home modem, which in turn communicate with the host modem.

12. The personal shopping system home station of claim 9, wherein said home data transfer circuit comprises a home modem which communicates with the host modem.

13. The personal shopping system home station of claim 9, wherein said portable terminal further comprises:
   a display for displaying information to the user; and
   a plurality of control keys for permitting the user to interact with the display.

14. The personal shopping system home station of claim 9, wherein:
   the kiosk data interface is a kiosk data interface;
   said home data interface is a home data interface;
   said two-way terminal data interface is a two-way terminal data interface; and
   said portable terminal further comprises an elongate pen-shaping housing having an end with an optically transparent passage therethrough, said memory and said two-way terminal data interface being arranged in said housing with said two-way terminal data interface positioned for data communication through said transparent passage.

15. The personal shopping system home station of claim 9, adapted for use with a personal shopping system which has at least one wireless multi-access point associated with the shopping establishment and coupled to the host computer, wherein said portable terminal further comprises:
   a wireless transceiver coupled to said memory and configured for wireless communication with the at least one wireless multi-access point; and
   a position-sensing module which senses position of the user within the shopping establishment and which enables communication with the user when the user has deviated from an optimal shopping path in the shopping establishment.

16. A personal shopping system portable terminal adapted for use with a personal shopping system which is in turn adapted for use in both a home of a user and at least one shopping establishment, the personal shopping system including a host computer coupled to a host modem, the personal shopping system also including a shopping establishment kiosk cradle coupled to the host computer and having a kiosk portable terminal-receiving station and a kiosk data interface, the personal shopping system further including a home cradle having a home portable terminal-receiving station and a home data interface, said personal shopping system portable terminal comprising:
   a memory for storing data associated with bar codes which are in turn associated with items related to shopping;
   a two-way terminal data interface coupled to said memory, said terminal data interface being configured for data exchange with said kiosk data interface when said portable terminal is received in said kiosk portable terminal-receiving station, said terminal data interface being configured for data exchange with said home data interface when said portable terminal is received in said home portable terminal-receiving station, said terminal data interface being configured for reading the bar codes associated with the items related to shopping; and
   intrinsic identifying indicia, contained in said portable terminal, to identify the user to the host computer;
   wherein:
      said home data transfer circuit supplies the host computer with the data associated with the bar codes when said portable terminal is received in the home portable terminal-receiving station;
      the shopping establishment kiosk cradle accepts the data associated with the bar codes from said portable terminal through the kiosk data interface and said terminal data interface when said portable terminal is received in the kiosk portable terminal-receiving station, and then downloads the data associated with the bar codes to the host computer; and
      the host computer receives the data associated with the bar codes and stores the data in a shopping list database.

17. The personal shopping system portable terminal of claim 16, wherein said memory is configured to store multiple lists of data associated with the bar codes, as multiple shopping lists corresponding to multiple shopping establishments.

18. The personal shopping system portable terminal of claim 16, wherein said portable terminal further comprises:
   a display for displaying information to the user; and
   a plurality of control keys for permitting the user to interact with the display.

19. The personal shopping system portable terminal of claim 16, wherein:
   the kiosk data interface is a kiosk data interface;
   the home data interface is a home data interface;
   said two-way terminal data interface is a two-way terminal data interface; and
   said portable terminal further comprises an elongate pen-shaping housing having an end with an optically transparent passage therethrough, said memory and said two-way terminal data interface being arranged in said housing with said two-way terminal optical interface positioned for optical communication through said transparent passage.

20. The personal shopping system portable terminal of claim 16, adapted for use with a personal shopping system which has at least one wireless multi-access point associated with the shopping establishment and coupled to the host computer, said portable terminal further comprising:
   a wireless transceiver coupled to said memory and configured for wireless communication with the at least one wireless multi-access point; and
   a position-sensing module which senses position of the user within the shopping establishment and which enables communication with the user when the user has deviated from an optimal shopping path in the shopping establishment.

21. A method of placing an order for items including at least one of goods and services, said method comprising the steps of:
   reading bar codes associated with the items with a two-way terminal data interface of a portable terminal;
   storing data associated with the bar codes in a memory of said portable terminal;
   transferring the data associated with the bar codes to a host computer for storage in a shopping list database, said transferring step including the sub-steps of:
      transferring the data associated with the bar codes from said memory of said portable terminal to said two-way terminal data interface of said portable terminal;
      transferring the data associated with the bar codes from said two-way terminal data interface to a data interface of one of:
         a kiosk portable terminal-receiving station of a shopping establishment kiosk cradle which is coupled to said host computer; and
         a home portable terminal-receiving station of a home cradle associated with a home of a user, said home cradle being coupled to said host computer; and then transferring the data to said host computer; and
      transmitting identifying indicia to said host computer to identify the user to the host computer.

22. The method of claim 21, wherein said transmitting step comprises transmitting intrinsic identifying indicia, contained in said portable terminal, from said portable terminal to said host computer to identify the user to the host computer.

23. The method of claim 21, wherein the data associated with the bar codes is transferred to said data interface of said home portable terminal-receiving station, said method further comprising the additional steps of:
   reading a bar code associated with a shopping establishment with said two-way terminal data interface of said portable terminal; and
   automatically contacting the shopping establishment when said portable terminal is placed in said home portable terminal-receiving station of said home cradle, on the basis of information encoded in the bar code associated with the shopping establishment.

24. The method of claim 21, further comprising the additional step of displaying relevant portions of said shopping list database on a display of said portable terminal.

25. The method of claim 21, wherein the data associated with the bar codes is transferred to said data interface of said home portable terminal-receiving station, further comprising the additional step of sending at least one verification query from said host computer to said home cradle to verify at least one of correctness and validity of an order which is based on said shopping list database.

26. The method of claim 25, wherein said step of sending said verification query includes sending said verification query as a human language audible query to a telephone which is coupled to said home cradle.

27. The method of claim 25, wherein said step of sending said verification query includes sending said verification query as a signal which triggers visual display of verification information on said portable terminal.

28. The method of claim 25, wherein said step of sending said verification query includes verifying caller ID of a telephone number associated with said home portable terminal-receiving station.

29. The method of claim 21, wherein:
   the data associated with the bar codes is transferred to said data interface of said home portable terminal-receiving station; and
   the data associated with the bar codes is transferred from said home portable terminal-receiving station, through an interface card, to a separate home personal computer of the user, and then through a home modem to said host computer;
   said method further comprising the additional steps of:
      sending at least one verification query from said host computer to the separate home computer; and
      responding to said at least one verification query with at least one response emanating from the separate home computer.

30. The method of claim 21, wherein the data associated with the bar codes is transferred to said data interface of said kiosk portable terminal-receiving station, said method further comprising the additional step of printing a hard copy shopping list from said kiosk cradle in response to the data associated with the bar codes.

31. The method of claim 21, wherein the data associated with the bar codes is transferred to said data interface of said kiosk portable terminal-receiving station, said method further comprising the additional steps of:
   scanning new items required to be purchased, in the shopping establishment, with said portable terminal; and
   updating an electronic list in said memory of said portable terminal to indicate that a given one of the new items has been obtained.

32. The method of claim 31, further comprising the additional step of periodically replacing said portable terminal in said kiosk portable-terminal receiving station of the shopping establishment in order to check said updated electronic list.

33. The method of claim 21, wherein the data associated with the bar codes is transferred to said data interface of said kiosk portable terminal-receiving station, said method further comprising the additional step of producing an optimized shopping list for the user in response to:
   said shopping list database; and
   information, contained in said host computer, about locations of the items within the shopping establishment;
   said optimized shopping list being ordered to direct the user through the shopping establishment in an efficient path.

34. The method of claim 21, further comprising the additional steps of:
   generating an optimized shopping list which is ordered to direct the user through the shopping establishment in an efficient path;
   sensing location of said portable terminal, and thus of the user, within the shopping establishment; and communicating a message to the user when the user has deviated from the efficient path.

35. The method of claim 21, wherein said storing step includes storing data pertaining to a given shopping establishment, further comprising the additional steps of:
repeating said reading step for items associated with another given shopping establishment; and
repeating said storing step for said items associated with said another given shopping establishment;
whereby multiple lists of items for at least two different shopping establishments are stored in said portable terminal.

36. A system for ordering and supplying selected goods and services, comprising:
a host computer having a host computer memory for providing centrally stored data;
one or more stackable cradle assemblies coupled to and in communication with said host computer, each of said cradle assemblies in turn comprising:
a plurality of docking stations each having a corresponding cradle data interface;
a data transfer circuit coupled to said cradle data interface for exchanging said centrally stored data and newly entered personnel management data therewith, said data transfer circuit being configured for exchanging said centrally stored and newly entered data with said host computer; and
a plurality of portable terminals for displaying said centrally stored data and for providing said newly entered data to said host computer, each of said portable terminals in turn comprising:
a memory for storing said centrally stored and newly entered personnel management data; and
a terminal data interface coupled to said memory, said terminal data interface being configured for exchanging said centrally stored and newly entered data with said cradle data interface when said portable terminal is docked within said corresponding one of said cradle docking stations;
wherein said cradle data transfer circuit supplies said host computer with said newly entered data when said portable terminal is docked within said corresponding one of said cradle docking stations, and said host computer receives said newly entered data and stores said newly entered data in said host computer memory.

37. The system of claim 36, further comprising:
a plurality of said cradle assemblies; and
a plurality of stacking elements connected to said cradle assemblies for interconnecting said plurality of said cradle assemblies in a stacked configuration.

38. The system of claim 37, wherein said stacked configuration comprises an arrangement of n cradles, wherein the bottommost cradle is the first cradle and the topmost cradle is the n-th cradle, and wherein each cradle i for i=1 to n requires n-i sets of said stacking elements attached to the backside of thereof, and wherein each cradle i for i=1 to n requires i-1 sets of said stacking elements attached thereunder.

39. The system of claim 36, wherein said data transfer circuit provides serial data communications between each of said portable terminals and said host computer.

40. The system of claim 36, wherein said data transfer circuit provides Ethernet-based data communications between each of said portable terminals and said host computer.

41. The system of claim 36, further comprising a plurality of said stackable cradle assemblies daisy chained to one another.

42. The system of claim 41, wherein at least one of said stackable cradle assemblies comprises a data transfer circuit for providing serial data communications between each of said portable terminals and said host computer.

43. The system of claim 41, wherein at least one of said stackable cradle assemblies comprises a data transfer circuit for providing Ethernet-based data communications between each of said portable terminals and said host computer.

44. The system of claim 36, wherein each of said stackable cradle assemblies comprises a plurality of visual indicators for displaying the operational status of said portable terminals.

45. The system of claim 36, further comprising:
means for detecting the presence and status of said portable terminals connected to said docking stations and corresponding cradle data interfaces;
means for automatically synchronizing said portable terminals with said host computer.

46. The system of claim 36, wherein each of said portable terminals further comprise means for performing diagnostic tests.

47. The system of claim 36, wherein said centrally stored personnel management data comprises bar code data associated with items related to shopping.

48. The system of claim 36, wherein said portable terminal further comprises:
a display for displaying information to the user; and
a plurality of control keys for permitting the user to interact with the display.

49. The system of claim 36, wherein said system is adapted for use as a personal shopping system.

50. A system for ordering and supplying selected goods and services, comprising:
a host computer;
a host modem coupled to said host computer;
at least one centrally located kiosk cradle coupled to said host computer, said at least one kiosk cradle in turn comprising:
a kiosk portable terminal-receiving station; and
a kiosk data interface associated with said kiosk portable terminal-receiving station;
a home cradle associated with the home of the user, said home cradle in turn comprising:
a home portable terminal-receiving station;
a home data interface associated with said home portable terminal-receiving station; and
a home data transfer circuit, said home data transfer circuit being coupled to said home data interface for data exchange therewith, said home data transfer circuit being configured for data exchange with said host modem; and
a portable terminal, said portable terminal in turn comprising:
a memory for storing data associated with bar codes; and
a two-way terminal data interface coupled to said memory, said terminal data interface being configured for data exchange with said kiosk data interface when said portable terminal is received in said kiosk portable terminal-receiving station, said terminal data interface being configured for data exchange with said home data interface when said portable terminal is received in said home portable terminal-receiving station, said terminal data interface being configured for reading the bar codes;

wherein:

said home data transfer circuit supplies said host computer with the data associated with the bar codes when said portable terminal is received in said home portable terminal-receiving station;

said kiosk cradle accepts the data associated with the bar codes from said portable terminal through said kiosk data interface and said terminal data interface when said portable terminal is received in said kiosk portable terminal-receiving station, and then downloads the data associated with the bar codes to said host computer; and said host computer receives the data associated with the bar codes and stores the data in a database.

51. The system of claim 50, wherein said portable terminal further comprises intrinsic identifying indicia to identify the user to said host computer.

52. The system of claim 50, wherein said home data transfer circuit comprises an interface card for coupling said home cradle to a separate home personal computer and home modem, which in turn communicate with said host modem.

53. The system of claim 50, wherein said portable terminal further comprises:

a display for displaying information to the user; and a plurality of control keys for permitting the user to interact with the display.

54. The system of claim 50, wherein said portable terminal further comprises an elongate pen-shaping housing having an end with an optically transparent passage therethrough, said memory and said two-way terminal data interface being arranged in said housing with said two-way terminal data interface positioned for data communication through said transparent passage.

55. The system of claim 50, further comprising at least one wireless multi-access point coupled to said host computer, wherein said portable terminal further comprises:

a wireless transceiver coupled to said memory and configured for wireless communication with said at least one wireless multi-access point; and a position-sensing module which senses position of the user and which enables communication with the user.

56. The personal shopping system according to claim 1, 9 or 16, further comprising a shopping list derived from one or more recipes that is provided to said kiosk cradle and said portable terminal from said host computer.

57. The personal shopping system of claim 56, wherein said shopping list can be modified by said user.

58. The personal shopping system of claim 56, wherein said shopping list includes a server multiplier for adjusting said shopping list according to a desired number of servings.

59. The personal shopping system according to claim 4 or 11, further comprising a shopping list derived from one or more recipes that is provided to said kiosk cradle and said portable terminal from said home personal computer.

60. The personal shopping system of claim 58, wherein said shopping list can be modified by said user.

61. The personal shopping system of claim 58, wherein said shopping list includes a server multiplier for adjusting said shopping list according to a desired number of servings.

62. The method of claim 21, further comprising the steps of:

generating a shopping list derived from one or more recipes; and providing said list to said kiosk cradle and said portable terminal.

63. The method of claim 62, further comprising the step of modifying said shopping list by said user.

64. The method of claim 62, further comprising the step of adjusting said shopping list according to a servings multiplier.

65. In an information system having a host computer and at least one portable terminal having a bar code reader, a shopping method comprising:

storing one or more recipes in said host computer, said recipes each includes a list of ingredients;

generating bar codes corresponding to said list;

forwarding said bar codes and list to said portable terminal;

displaying said list at said portable terminal;

scanning, as required, goods corresponding to said ingredients until all goods corresponding to said ingredients have been individually acquired;

logging said scanning of goods to verify complete scanning of said goods corresponding to said ingredients.

66. The method of claim 65, further comprising the step of adjusting said the quantities of said goods to be scanned in accordance to a servings multiplier.

67. The method of claim 65, further comprising the step of modifying said list as required via said portable terminal by a user.

* * * * *